US012684265B2

(12) United States Patent
Lee et al.

(10) Patent No.: US 12,684,265 B2
(45) Date of Patent: Jul. 14, 2026

(54) IMAGE SENSOR

(71) Applicant: Samsung Electronics Co., Ltd.,
Suwon-si (KR)

(72) Inventors: Taesung Lee, Suwon-si (KR);
Hyungeun Yoo, Suwon-si (KR); **Yunki
Lee**, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 51 days.

(21) Appl. No.: 18/982,363

(22) Filed: Dec. 16, 2024

(65) Prior Publication Data

US 2025/0254445 A1     Aug. 7, 2025

(30) Foreign Application Priority Data

Feb. 7, 2024     (KR) ......................... 10-2024-0019159

(51) Int. Cl.
H04N 25/77          (2023.01)
H04N 25/11          (2023.01)
H04N 25/704         (2023.01)

(52) U.S. Cl.
CPC ............. H04N 25/77 (2023.01); H04N 25/11
(2023.01); H04N 25/704 (2023.01)

(58) Field of Classification Search
CPC ...... H04N 25/11; H04N 25/134; H04N 25/77;
H04N 25/704; H04N 25/133; H04N
25/136
USPC .................................................... 348/207.99
See application file for complete search history.

(56) References Cited

U.S. PATENT DOCUMENTS

| | | | |
|---|---|---|---|
| 9,860,438 B2 | 1/2018 | Nakata | |
| 10,367,992 B2 * | 7/2019 | Nakata | H04N 25/704 |
| 10,964,734 B2 | 3/2021 | Shim | |
| 11,258,993 B2 * | 2/2022 | Hoshino | H04N 25/13 |
| 11,483,526 B2 * | 10/2022 | Hoshino | H04N 25/13 |
| 11,523,071 B1 | 12/2022 | Powell | |
| 11,765,470 B2 * | 9/2023 | Choi | H04N 25/135 |
| | | | 348/207.99 |
| 12,231,794 B2 * | 2/2025 | Lee | H04N 25/77 |
| 12,543,386 B2 * | 2/2026 | Jeong | H10F 39/18 |

(Continued)

FOREIGN PATENT DOCUMENTS

| | | |
|---|---|---|
| JP | 2022-105820 A | 7/2022 |
| KR | 10-2022-0078355 A | 6/2022 |

*Primary Examiner* — Pritham D Prabhakher
(74) *Attorney, Agent, or Firm* — Fish & Richardson P.C.

(57)     ABSTRACT

An image sensor includes a first pixel and a second pixel.
The first pixel includes a first photodiode, a second photo-
diode at least partially overlapping the first photodiode in a
first direction, a first metal shield on one photodiode of the
first photodiode or the second photodiode in a vertical
direction perpendicular to the first direction, a first color
filter on another photodiode of the first photodiode or the
second photodiode in the vertical direction, and a first micro
lens on both the first metal shield and the first color filter in
the vertical direction. The second pixel includes a third
photodiode, a fourth photodiode at least partially overlap-
ping the third photodiode in the first direction, a second
color filter on both the third photodiode and the fourth
photodiode in the vertical direction, and a second micro lens
on the second color filter in the vertical direction.

17 Claims, 13 Drawing Sheets

(56)     References Cited

U.S. PATENT DOCUMENTS

| | | | |
|---|---|---|---|
| 2016/0050359 A1* | 2/2016 | Nakata | G02B 7/34 |
| | | | 250/201.2 |
| 2020/0235148 A1* | 7/2020 | Shim | H10F 39/8027 |
| 2020/0260054 A1* | 8/2020 | Masagaki | H04N 25/778 |
| 2020/0358989 A1* | 11/2020 | Hoshino | H04N 25/13 |
| 2021/0258500 A1* | 8/2021 | Nakata | G03B 13/36 |
| 2022/0038663 A1* | 2/2022 | Hoshino | H04N 25/13 |
| 2022/0132079 A1* | 4/2022 | Choi | H04N 25/78 |
| 2022/0181372 A1 | 6/2022 | Lee et al. | |
| 2022/0190023 A1 | 6/2022 | Jeong et al. | |
| 2023/0232100 A1* | 7/2023 | Nakata | G03B 13/36 |
| | | | 257/432 |
| 2024/0064401 A1 | 2/2024 | Tanaka | |

* cited by examiner

IMAGE SENSOR

CROSS-REFERENCE TO RELATED APPLICATION

This application is based on and claims priority under 35 U.S.C. § 119 to Korean Patent Application No. 10-2024-0019159, filed on Feb. 7, 2024, in the Korean Intellectual Property Office, the disclosure of which is incorporated by reference herein in its entirety.

BACKGROUND

The inventive concepts relate to image sensors, and more particularly, relate to image sensors including an auto focusing (AF) pixel.

Image sensors, which capture images and convert the images into electrical signals, are used not only in general consumer electronic devices such as digital cameras, mobile phone cameras, and portable camcorders, but also in cameras mounted on cars, security devices, and robots. This image sensor may have a pixel array, and each pixel included in the pixel array may include a photodiode. The image sensor is required to perform an auto focusing (AF) function so that image capture may be performed quickly and accurately.

SUMMARY

Some example embodiments of the inventive concepts provide an image sensor that may include pixels including metal shields and pixels including no metal shield, and may receive image information according to pixel signals generated by photodiodes including no metal shield and perform phase difference computation, thereby improving an auto focusing (AF) speed and reducing power consumption.

According to some example embodiments of the inventive concepts, an image sensor may include a first pixel and a second pixel. The first pixel may include a first photodiode, a second photodiode at least partially overlapping the first photodiode in a first direction, a first metal shield on one photodiode of the first photodiode or the second photodiode in a vertical direction perpendicular to the first direction, a first color filter on another photodiode of the first photodiode or the second photodiode in the vertical direction, and a first micro lens ML1 disposed on both the first metal shield and the first color filter in the vertical direction, and the second pixel may include a third photodiode, a fourth at least partially overlapping the third photodiode in the first direction, a second color filter on both the third photodiode and the fourth photodiode in the vertical direction, and a second micro lens on the second color filter in the vertical direction.

According to some example embodiments of the inventive concepts, an image sensor may include a pixel array, the pixel array including a plurality of pixels arrayed in a first direction and a second direction, the plurality of pixels including a first pixel and a second pixel. The first pixel may include a first photodiode, a second photodiode at least partially overlapping the first photodiode in the first direction, a first metal shield on one photodiode of the first photodiode or the second photodiode in a vertical direction perpendicular to both the first direction and the second direction, and a first color filter on another photodiode of the first photodiode or the second photodiode in the vertical direction, and the second pixel may include a third photodiode, a fourth photodiode at least partially overlapping the third photodiode in the first direction, and a second color filter on both the third photodiode and the fourth photodiode in the vertical direction.

According to some example embodiments of the inventive concepts, an image sensor may include a pixel array including a plurality of pixels arrayed in a first direction and a second direction. The plurality of pixels may include a first pixel, a second pixel, a third pixel, and a fourth pixel. The first to fourth pixels may be adjacent to each other. The first pixel may include a first photodiode and a metal shield on the first photodiode, and the second pixel may include a second photodiode and a color filter on the second photodiode.

BRIEF DESCRIPTION OF THE DRAWINGS

Example embodiments will be more clearly understood from the following detailed description taken in conjunction with the accompanying drawings in which.

DETAILED DESCRIPTION

Figure 1:
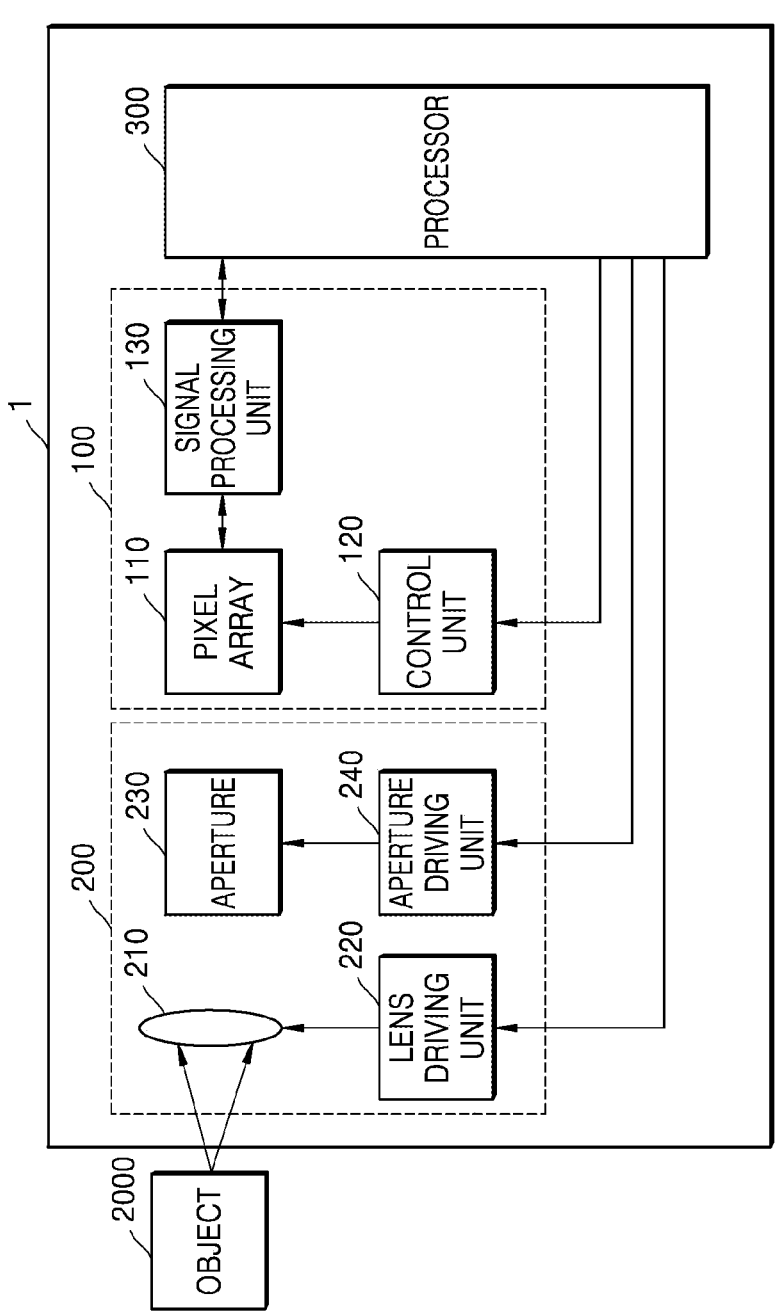
FIG. 1 is a diagram illustrating an example structure of a digital imaging device according to some example embodiments.

Some example embodiments are described below in detail with reference to the attached drawings.

In order to clearly explain the present inventive concepts in the drawings, parts that are not related to the description are omitted, and similar parts are given similar reference numerals throughout the specification. In the flowchart described with reference to the drawings, the order of operations may be changed, several operations may be merged, certain operations may be divided, and certain operations may not be performed.

Additionally, expressions written in the singular may be interpreted as singular or plural, unless explicit expressions such as "one" or "single" are used. Terms containing ordinal numbers, such as first, second, etc., may be used to describe various elements, but the elements are not limited by these terms. These terms may be used for the purpose of distinguishing one component from another.

Throughout the specification, the term "connected" does not mean only that two or more constituent components are directly connected, but may also mean that two or more constituent components are indirectly connected through another constituent component. In addition, unless explicitly described to the contrary, the word "comprise", and variations such as "comprises" or "comprising", will be understood to imply the inclusion of stated elements but not the exclusion of any other elements.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is referred to as being "above" or "on" a reference element, it can be positioned above or below the reference element, and it is not necessarily referred to as being positioned "above" or "on" in a direction opposite to gravity.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular", "substantially parallel", or "substantially coplanar" with regard to other elements and/or properties thereof will be understood to be "perpendicular", "parallel", or "coplanar", respectively, with regard to the other elements and/or properties thereof within manufacturing tolerances and/or material tolerances and/or have a deviation in magnitude and/or angle from "perpendicular", "parallel", or "coplanar", respectively, with regard to the other elements and/or properties thereof that is equal to or less than 10% (e.g., a. tolerance of ±10%).

It will be understood that elements and/or properties thereof may be recited herein as being "identical", "the same", or "equal" as other elements and/or properties thereof, and it will be further understood that elements and/or properties thereof recited herein as being "identical" to, "the same" as, or "equal" to other elements and/or properties thereof may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to, equal to or substantially equal to, and/or the same or substantially the same as other elements and/or properties thereof may be structurally the same or substantially the same, functionally the same or substantially the same, and/or compositionally the same or substantially the same. While the term "same," "equal" or "identical" may be used in description of some example embodiments, it should be understood that some imprecisions may exist. Thus, when one element or property is referred to as being identical to, equal to, or the same as another element or property, it should be understood that the element or property is the same as another element or property within a desired manufacturing or operational tolerance range (e.g., ±10%).

It will be understood that elements and/or properties thereof described herein as being "substantially" the same, equal, and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.). Similarly, a structure described herein to be between two other structures to separate the two other structures from each other may be understood to be configured to isolate the two other structures from direct contact with each other.

FIG. 1 is a diagram illustrating an example structure of a digital imaging device 1 according to some example embodiments. FIG. 1 is a diagram for explaining that the digital imaging device 1 is configured to perform an auto-focus (AF) function.

Referring to FIG. 1, the digital imaging device 1 may include an imaging unit 200, an image sensor 100, and a processor 300. The digital imaging device 1 may have a focus detection function (e.g., may be configured to perform focus detection).

The overall operation of the digital imaging device 1 may be controlled by the processor 300. The processor 300 may provide a control signal for controlling (e.g., to control) the operation of each component to a lens driving unit 220, an aperture driving unit 240, a control unit 120, etc.

The imaging unit 200 is a component that receives light and may include a lens 210, the lens driving unit 220, an aperture 230, and the aperture driving unit 240. The lens 210 may have (e.g., may include) a plurality of lenses.

The lens driving unit 220 may communicate information about focus detection with the processor 300 and may adjust the position of the lens 210 according to a control signal provided by the processor 300. The lens driving unit 220 may move the lens 210 in a direction of increasing or decreasing a distance from an object 2000. Accordingly, the distance between the lens 210 and the object 2000 may be adjusted. The object 2000 may be in focus or out of focus in an image captured on the image sensor 100 depending on the position of the lens 210 (e.g., the position of the lens 210 in relation to the pixel array 110 of the image sensor 100).

For example, when the distance between the lens 210 and the object 2000 is relatively close, the lens 210 may be out of an in-focus position for focusing on the object 2000, and a phase difference may be generated between images captured on the image sensor 100. The lens driving unit 220 may move the lens 210 in the direction of increasing the distance from the object 2000 (e.g., moving the lens 210 closer to the pixel array 110), based on a control signal provided by the processor 300.

In another example, when the distance between the lens 210 and the object 2000 is relatively long, the lens 210 may be out of the in-focus position, and a phase difference may be generated between images formed on the image sensor 100. The lens driving unit 220 may move the lens 210 in the direction of decreasing the distance from the object 2000 (e.g., moving the lens 210 further from the pixel array 110), based on a control signal provided by the processor 300.

The image sensor 100 may convert incident light (e.g., incident on the image sensor 100 through the lens 210) into an image signal to thereby "capture" an image (also referred to herein interchangeably as generating the image). The image sensor 100 may include a pixel array 110, the control unit 120, and a signal processing unit 130. An optical signal passing from the object 2000 and through the lens 210 and the aperture 230 may reach a light-receiving surface of the pixel array 110 and form an image of the object 2000.

The pixel array 110 may include a complementary metal oxide semiconductor image sensor (CIS) that converts optical signals into electrical signals. The pixel array 110 may be adjusted in sensitivity, etc. by the control unit 120. The pixel array 110 may include a plurality of pixels that convert optical signals into electrical signals. The plurality of pixels may generate pixel signals according to the intensity of each sensed light.

The pixel array 110 according to some example embodiments may include a plurality of pixels, which may include one or more AF pixels. Among the plurality of pixels, an AF pixel may include two photodiodes (light sensing elements), a metal shield, and a micro lens, and the remaining AF pixels may each include two photodiodes, a color filter, and a micro lens. The metal shield may block a path of light incident through the micro lens. Since the pixel including the metal shield may block incident light, the image sensor 100 may perform an AF function by using a phase difference of light incident through the remaining AF pixels.

The image sensor 100 may provide image information to the processor 300, and the processor 300 may perform phase difference computation by using the image information. For example, the processor 300 may receive image information generated by an AF pixel from the signal processing unit 130 and perform phase difference computation, and the phase difference computation may be obtained by performing correlation computation of the image information. The processor 300 may obtain the position of a focus, the direction of the focus, or the distance between the object 2000 and the image sensor 100. The processor 300 may output a control signal to the lens driving unit 220, thereby moving the position of the lens 210, based on a phase difference computation result.

The processor 300 may reduce noise with respect to an input signal, and perform image signal processing for picture-quality improvement, such as gamma correction, color filter array interpolation, color matrix, color correction, and color enhancement. Also, the processor 300 may compress image data generated by performing the image signal processing for the picture-quality improvement and generate an image file, or may restore the image data from the image file.

Figure 2:
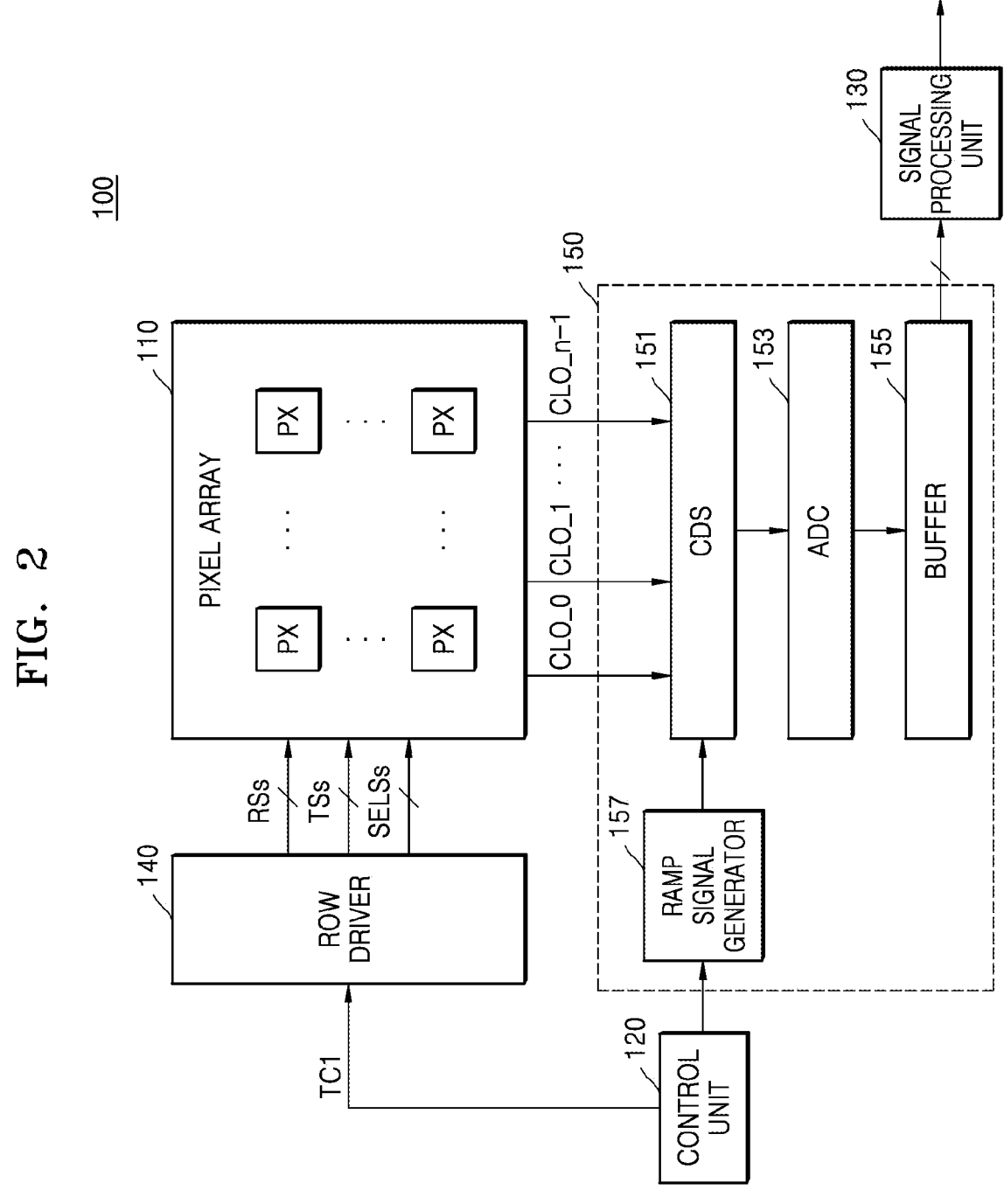
FIG. 2 is a block diagram illustrating an image sensor according to some example embodiments.

FIG. 2 is a block diagram illustrating an image sensor 100 according to some example embodiments.

The image sensor 100 may be mounted on an electronic device having a function of sensing an image or light. For example, the image sensor 100 may be mounted on an electronic devices such as a camera, a smartphone, a wearable device, an Internet of Things (IoT) device, home appliances, a tablet personal computer (PC), a personal digital assistant (PDA), a portable multimedia player (PMP), a navigation, a drone, an advanced driver assistance system (ADAS), etc. Also, the image sensor 100 may be mounted on an electronic device that is included as a component in a vehicle, furniture, a manufacturing facility, a door, various measuring devices, etc.

Referring to FIG. 2, the image sensor 100 may include a pixel array 110, a control unit 120, a signal processing unit 130, a row driver 140, and a signal read unit 150. The signal read unit 150 may include a correlated-double sampler (CDS) 151, an analog-to-digital converter (ADC) 153, a buffer 155, and a ramp signal generator 157.

The pixel array 110 may include a plurality of pixels PX that convert optical signals (e.g., based on incident light being incident on the pixels PX) into electrical signals. The plurality of pixels PX may generate pixel signals according to the intensity of each sensed light (e.g., the intensity of the incident light that is incident thereon). The plurality of pixels PX may include general pixels for performing an image capturing function (e.g., pixels configured to absorb incident light and generate and transmit an electrical signal, also referred to herein as a pixel signal indicating an image of light absorbed at the pixel), and may include AF pixels for performing an AF function or a distance measurement function. When the AF pixels do not perform the AF function, the AF pixels may generate pixel signals for image capture like the general pixels.

The image sensor 100 according to some example embodiments may include a plurality of pixels, which may include one or more AF pixels. Among the plurality of pixels, an AF pixel may include two photodiodes (light sensing elements), a metal shield, and a micro lens, and the remaining AF pixels may each include two photodiodes, a color filter, and a micro lens. The metal shield may block a path of light incident through the micro lens such that the blocked light is blocked from reading a structure (e.g., a photodiode) that is covered (e.g., vertically overlapped) by the metal shield. For example, the metal shield may isolate a photodiode of the AF pixel from light that is incident on the AF pixel, such that the isolated photodiode may be configured to not sense (e.g., receive and photoelectrically convert) such incident light. Since the pixel including the metal shield may block the incident light, the image sensor 100 may perform the AF function by using a phase difference of light incident through the remaining AF pixels.

Each of the pixels PX may output a pixel signal to the CDS 151 through corresponding first column output line CLO_0 to (n–1)th column output line CLO_n–1 (n being any positive integer). In some example embodiments, the pixel signals output respectively from the plurality of pixels in an AF mode may include phase signals used to calculate a phase difference of incident light. The phase signals may include information about (e.g., information associated with) the positions of images formed on the image sensor 100, and the in-focus position of the lens (e.g., 210 in FIG. 1) may be calculated based on the calculated phase difference. The phase signals may be used not only for a function of focusing on an object, but also for measuring the distance between the object (e.g., 2000 in FIG. 1) and the image sensor 100.

The control unit 120 may control the row driver 140 to allow the pixel array 110 to absorb light and accumulate charges or temporarily store the accumulated charges and output an electrical signal dependent on the stored charges to the outside of the pixel array 110. Also, the control unit 120 may control the signal read unit 150 to measure a level of a pixel signal provided by the pixel array 110.

The row driver 140 may generate signals RSs, TSs, and SELSs for controlling the pixel array 110 and provide the signals RSs, TSs, and SELSs to the plurality of pixels PX. In some example embodiments, the row driver 140 may determine the timing of activation and deactivation of the reset control signals RSs, the transmission control signals TSs, and the selection signals SELSs provided to the AF pixels PX, thereby performing the AF function or the distance measurement function.

The CDS 151 may sample and hold a pixel signal provided by the pixel array 110. The CDS 151 may doubly sample a level (e.g., magnitude) of a specific noise and a level (e.g., magnitude) of the pixel signal and output a level (e.g., magnitude) corresponding to a difference between the levels. Also, the CDS 151 may receive a ramp signal generated by the ramp signal generator 157, compare the ramp signals with each other, and output a comparison result. The analog-to-digital converter 153 may convert an analog signal corresponding to the level received from the CDS 151 into a digital signal. The buffer 155 may latch the digital signal, and the latched signal may be sequentially output to the signal processing unit 130 or the outside of the image sensor 100.

The signal processing unit 130 may perform signal processing, based on received pixel signals output from the plurality of pixels PX. For example, the signal processing unit 130 may perform noise reduction processing, gain adjustment, waveform normalization processing, interpolation processing, white balance processing, gamma processing, edge emphasis processing, etc. Also, the signal processing unit 130 may perform signal processing, based on phase signals output from the AF pixels PX during AF operation, and may output signal-processed information to a processor (300 in FIG. 1), thereby allowing the processor (300 in FIG. 1) to perform phase difference computation for the AF operation. In some example embodiments, the signal processing unit 130 may be also provided in the processor (e.g., 300 in FIG. 1) external to the image sensor 100.

Figure 3:
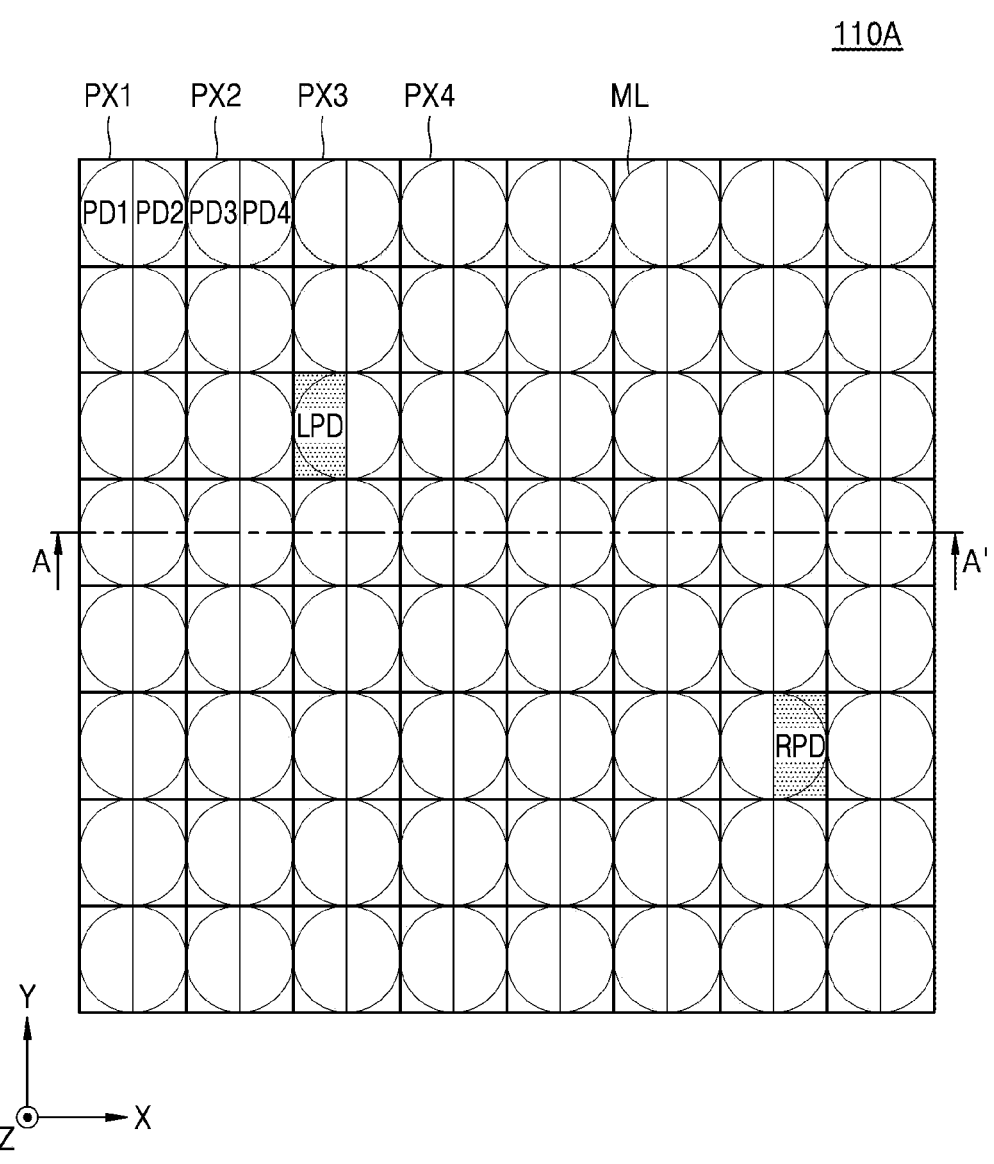
FIG. 3 is a diagram illustrating a pixel array of an image sensor according to some example embodiments.

FIG. 3 is a diagram illustrating a pixel array 110A of an image sensor according to some example embodiments.

Referring to FIG. 3, the pixel array 110A may include a plurality of pixels PX1, PX2, PX3, and PX4 arranged (e.g., extending, arrayed, etc.) in a first direction X and a second direction Y. The second direction Y may be different from (e.g., perpendicular to) the first direction X. The first direction X and the second direction Y may each include a direction horizontal to a semiconductor substrate in which the pixel array 110A is formed. For example, first direction X and the second direction Y may each include a direction parallel to an in-plane direction of a semiconductor substrate in which the pixel array 110A is formed, parallel to an upper surface of the semiconductor substrate, parallel to a bottom surface of the semiconductor substrate, parallel to an in-plane direction of the pixel array 110A, parallel to an upper surface of the pixel array 110A, parallel to a bottom surface of the pixel array 110A, any combination thereof, or the like. The plurality of pixels PX1, PX2, PX3, and PX4 may include AF pixels.

One micro lens 210 corresponding to each of the plurality of pixels PX1, PX2, PX3, and PX4 may be formed. A micro lens 210 corresponding to one or more pixels PX may overlap the one or more pixels PX in a third direction Z, also referred to herein as a vertical direction, which may be perpendicular to the first and second directions X and Y, perpendicular to an in-plane direction of a semiconductor substrate in which the pixel array 110A is formed, perpendicular to an upper surface of the semiconductor substrate, perpendicular to a bottom surface of the semiconductor substrate, perpendicular to an in-plane direction of the pixel array 110A, perpendicular to an upper surface of the pixel array 110A, perpendicular to a bottom surface of the pixel array 110A, any combination thereof, or the like. With respect to FIG. 3, an example has been described in which the first pixel PX1 and the second pixel PX2 are arranged side by side in the first direction X, for example such that the first pixel PX2 and the second pixel PX2 at least partially overlap in the first direction X. The first pixel PX1 and the second PX2 may be adjacent to each other in the first direction X. However, the image sensor 100 of the inventive concepts is not limited thereto, and the first pixel PX1 and the second pixel PX2 may be also arranged side by side in the second direction Y, for example such that the first pixel PX2 and the second pixel PX2 at least partially overlap in the second direction Y.

The first pixel PX1 may include a first photodiode PD1 and a second photodiode PD2. The first photodiode PD1 and the second photodiode PD2 may be arranged side by side in the first direction X, for example such that the first photodiode PD1 and the second photodiode PD2 at least partially overlap in the first direction X. For example, the first photodiode PD1 may be arranged at the left side within the first pixel PX1, and the second photodiode PD2 may be arranged at the right side within the first pixel PX1. For example, the first pixel PX1 may include a first subpixel and a second subpixel. The first subpixel may include the first photodiode PD1, and the second subpixel may include the second photodiode PD2.

The second pixel PX2 may include a third photodiode PD3 and a fourth photodiode PD4. The third photodiode PD3 and the fourth photodiode PD4 may be arranged side by side in the first direction X, for example such that the third photodiode PD3 and the fourth photodiode PD4 at least partially overlap in the first direction X. For example, the third photodiode PD3 may be arranged at the left side within the second pixel PX2, and the fourth photodiode PD4 may be arranged at the right side within the second pixel PX2.

That is, the plurality of pixels PX1, PX2, PX3, and PX4 shown in FIG. 3 may each have two photodiodes formed for one pixel, and the two photodiodes may be formed to divide the pixel equally and form symmetrical arrangement.

Color filters may be formed in each of the plurality of pixels PX1, PX2, PX3, and PX4 so that the plurality of pixels PX1, PX2, PX3, and PX4 may sense various colors. In some example embodiments, the color filters may include a red filter for sensing red (e.g., incident light in a red wavelength spectrum), a green filter for sensing green (e.g., incident light in a green wavelength spectrum), and a blue filter for sensing blue (e.g., incident light in a blue wavelength spectrum).

In some example embodiments, among the plurality of pixels PX1, PX2, PX3, and PX4, one pixel may include no color filter CF. For example, the first pixel PX1 may include a metal shield instead of the color filter, and the remaining pixels PX2, PX3, and PX4 may each include the color filter. Since the metal shield may block incident light, the image sensor may perform an AF function by using phase signals each output from the remaining pixels PX2, PX3, and PX4.

In some example embodiments, among the plurality of pixels PX1, PX2, PX3, and PX4, one or more pixels may each include a metal shield. For example, the pixel may include a metal shield in a left photodiode LPD in the first direction X. Also, the pixel may include a metal shield in a right photodiode RPD in the first direction X. A construction in which the metal shield is arranged over the left photodiode LPD is described with reference to FIGS. 7 and 11. A construction in which the metal shield is arranged over the right photodiode RPD is described with reference to FIGS. 8 and 12.

A pixel group arranged in one row and one column adjacent to each other may be formed. For example, the first pixel PX1, the second pixel PX2, the third pixel PX3, and the fourth pixel PX4 constituting one pixel group are arranged adjacent to each other in one row and one column. However, this is only an example and the pixels constituting one pixel group may be arranged in various ways. Although not shown in FIG. 3, a pixel group arranged in two rows and two columns adjacent to each other may be formed.

In some example embodiments, pixel groups within the pixel array 110A may be arranged to correspond to a Bayer pattern including red, green, and blue colors. However, this is only an example, and the pixel array 110A according to some example embodiments may include various types of color filters. For example, the color filters may include filters for sensing yellow, cyan, and magenta colors. Alternatively, the color filters may include a filter for sensing white color.

Figure 4:
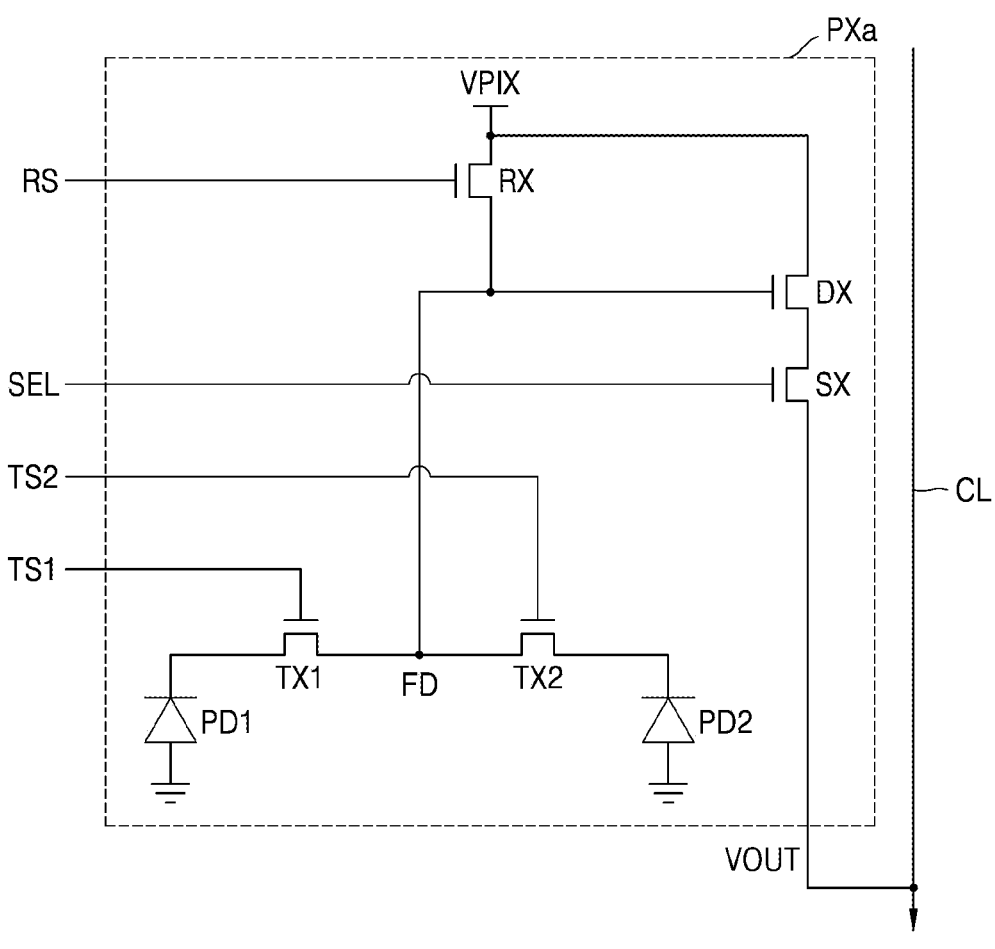
FIG. 4 is a circuit diagram illustrating a pixel included in an image sensor according to some example embodiments.

FIG. 4 is a circuit diagram illustrating a pixel PXa included in an image sensor according to some example embodiments.

The pixel PXa of FIG. 4 may correspond to the pixel PX of FIG. 2, and may correspond to the pixels PX1, PX2, PX3, and PX4 included in FIG. 3.

Referring to FIG. 4, the pixel PXa may include a first photodiode PD1, a second photodiode PD2, a first transfer transistor TX1, a second transfer transistor TX2, a reset transistor RX, a driving transistor DX, and a selection transistor SX.

Each of the first photodiode PD1 and the second photodiode PD2 may generate light charges that are variable depending on the intensity of light (e.g., incident light).

When the first transfer transistor TX1 is turned on in response to a first transfer control signal TS1 applied to a gate terminal of the first transfer transistor TX1, charges (e.g., light charges) generated by the first photodiode PD1 may be transmitted to and stored in a floating diffusion node FD. When the second transfer transistor TX2 is turned on in response to a second transfer control signal TS2, charges generated by the second photodiode PD2 may be transmitted to and stored in the floating diffusion node FD. The first transmission control signal TS1 and the second transmission control signal TS2 are separate signals, and turn-on points of the first transfer transistor TX1 and the second transfer transistor TX2 may be controlled independently respectively by the first transmission control signal TS1 and the second transmission control signal TS2. For example, the first transmission control signal TS1 and the second transmission control signal TS2 may be complementary to each other. The charges stored in the floating diffusion node FD may be output as a pixel signal VOUT.

The floating diffusion node FD may be shared by the first transfer transistor TX1 and the second transfer transistor TX2. The first photodiode PD1 and the first transfer transistor TX1 may be referred to as a first subpixel, and the second photodiode PD2 and the second transfer transistor TX2 may be referred to as a second subpixel.

The driving transistor DX may be controlled according to the amount of light charges accumulated in the floating diffusion node FD. The driving transistor DX is a buffer amplifier and may buffer a signal dependent on the charges charged to the floating diffusion node FD. The driving transistor DX may amplify an electric potential change at the floating diffusion node FD, and output the pixel signal VOUT to a column line CL.

The reset transistor RX may periodically reset the charges accumulated in the floating diffusion node FD. A first terminal of the reset transistor RX may be connected to the floating diffusion node FD, and a second terminal of the reset transistor RX may be connected to a power supply voltage VPIX. When the reset transistor RX is turned on according to a reset control signal RS, the power supply voltage VPIX connected to the reset transistor RX may be transferred to the floating diffusion node FD. When the reset transistor RX is turned on, the charges accumulated in the floating diffusion node FD may be discharged and the floating diffusion node FD may be reset.

The selection transistor SX may be connected to the driving transistor DX and may output the pixel signal VOUT through the column line CL in response to a selection signal SEL.

Figure 5:
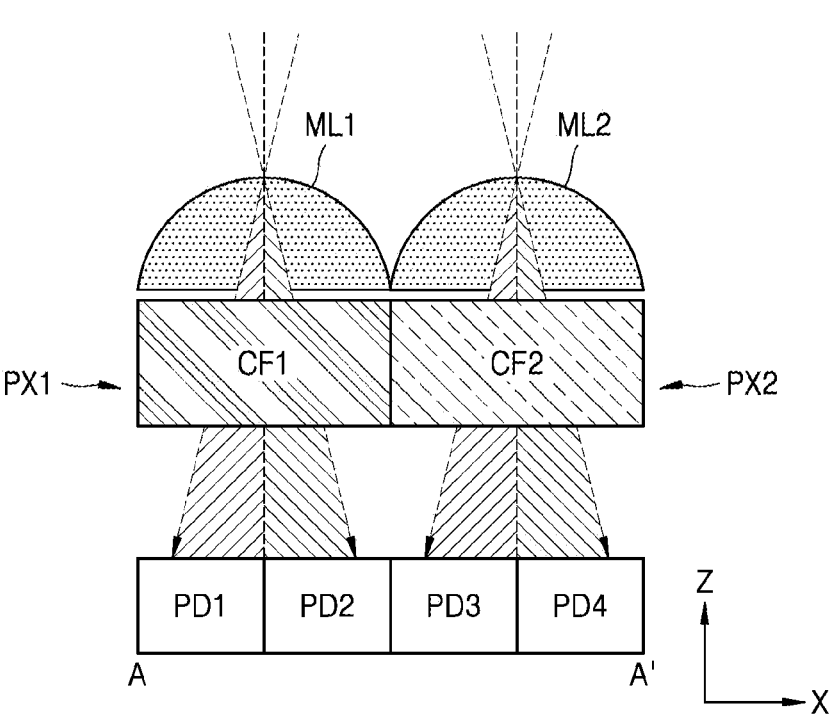
FIGS. 5 and 6 are schematic cross-sectional views illustrating pixels included in an image sensor along line A-A' of FIG. 3 according to some example embodiments.
Figure 6:
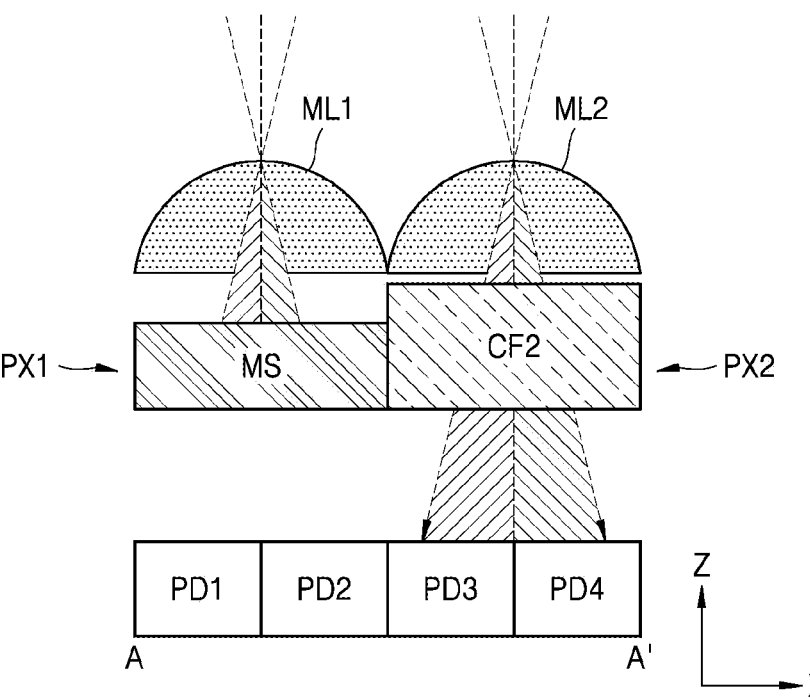

FIGS. 5 and 6 are schematic cross-sectional views illustrating pixels included in an image sensor along line A-A' of FIG. 3 according to some example embodiments.

Referring to FIG. 5, the image sensor 100 may include a plurality of micro lenses ML1 and ML2, a plurality of photodiodes PD1, PD2, PD3, and PD4, and a plurality of color filters CF1 and CF2. One pixel may include two photodiodes. This may be referred to as a dual-photodiode (dual PD). One color filter and one pixel (two photodiodes) may be disposed below one micro lens, such that the micro lens may be on the color filter and the pixel (e.g., at least partially overlapping the color filter and the pixel in the third direction Z extending perpendicular to an in-plane direction of the plurality of pixels.

Referring to FIG. 6, the image sensor 100 may include a plurality of micro lenses ML1 and ML2, a plurality of photodiodes PD1, PD2, PD3, and PD4, a metal shield MS, and a color filter CF2. The metal shield MS may include metal components and block the travel or propagation of light. For example, the metal shield MS may be formed of a metal film such as tungsten (W), aluminum (Al), copper (Cu), titanium (Ti), molybdenum (Mo), or nickel (Ni).

Referring to FIGS. 5 and 6 together, the first color filter CF1, and the first photodiode PD1 and second photodiode PD2 included in the first pixel PX1 may be disposed below the first micro lens ML1, and the second color filter CF2, and the third photodiode PD3 and fourth photodiode PD4 included in the second pixel PX2 may be disposed below the second micro lens ML2. That is, when the image sensor has two separated photodiodes within one pixel, since the two photodiodes are formed in different positions (e.g., different positions in the first and/or second directions X and/or Y), a phase difference generated from each of the two photodiodes (e.g., a phase difference between electrical signals generated by the two photodiodes based on each absorbing incident light) may occur. The image sensor may compute the phase difference and perform an AF function.

Referring again to FIG. 5, part of light incident on the center of the first micro lens ML1 may pass through the first color filter CF1 and form an image on the first photodiode PD1. The remaining part of the light incident on the center of the micro lens ML1 may pass through the first color filter CF1 and form an image on the second photodiode PD2. Part of light incident on the center of the second micro lens ML2 may pass through the second color filter CF2 and form an image on the third photodiode PD3, and the remaining part of the light incident on the center of the second micro lens ML2 may pass through the second color filter CF2 and form an image on the fourth photodiode PD4. It will be understood that light forming an image on a photodiode may be referred to interchangeably as the light being incident on the photodiode such that the photodiodes absorb the light and generates an electrical signal indicating an image base on absorbing the light (e.g., based on photoelectrically converting the light).

Referring to FIG. 6, the metal shield MS may be on the first and second photodiodes PD1 and PD2 (e.g., in the third direction Z), such that the metal shield MS at least partially overlaps the first and second photodiodes PD1 and PD2 in the third direction Z. As shown in FIG. 6, a path of light incident on the center of the first micro lens ML1 may be blocked by the metal shield MS, and as a result, the incident light may form no image on the first photodiode PD1 and the second photodiode PD2 (e.g., the metal shield MS may block the incident light from reaching the first and second photodiodes PD1 and PD2, the metal shield may isolate the first and second photodiodes PD1 and PD2 from incident light, etc.). Part of light incident on the center of the second micro lens ML2 may pass through the second color filter CF2 and form an image on the third photodiode PD3, and the remaining part of the light incident on the center of the second micro lens ML2 may pass through the second color filter CF2 and form an image on the fourth photodiode PD4.

For example, referring to FIG. 5, light incident in the right direction on the center of the first micro lens ML1 may pass through the first color filter CF1, and only light of a specific wavelength band may be transmitted (e.g., selectively transmitted) from the first color filter CF1, and the transmitted light of the specific wavelength band may form an image on the first photodiode PD1. Light incident in the right direction on the center of the second micro lens ML2 may pass through the second color filter CF2 and only light of a specific wavelength band may be transmitted (e.g., selectively transmitted) from the second color filter CF2, and the transmitted light of the specific wavelength band may form an image on the third photodiode PD3. Accordingly, the image sensor may implement AF by using a phase difference of the images formed on the first photodiode PD1 and the third photodiode PD3. In other words, because the image sensor receives image information according to pixel signals generated by the first pixel PX1 and the second pixel PX2 and performs phase difference computation, there was a disadvantage that an AF speed was slow and the power consumption of the image sensor was large.

However, referring to FIG. 6, in some example embodiments, the path of light incident in the right direction on the center of the first micro lens ML1 may be blocked by the metal shield MS (e.g., blocked by the metal shield MS from reaching the first photodiode PD1), and as a result, the incident light may form no image on the first photodiode PD1. Therefore, according to some example embodiments, by forming the metal shield MS instead of the color filter in one pixel, the image sensor may block paths of light incident on a pixel in various directions (e.g., up direction, right direction, and left direction), and may therefore be configured to real-time reflect a phase of an image formed on the photodiode of the remaining pixel and implement AF. That is, the image sensor may receive image information according to a pixel signal generated by one pixel and perform phase difference computation, thereby improving an AF speed and reducing the power consumption of the image sensor (e.g., reduce power consumption to perform an AF function). As a result, the functionality of an image sensor may be improved based on the image sensor including multiple pixels where at least one pixel includes a metal shield on a photodiode thereof while another pixel does not include any metal shield on one or more or all photodiodes thereof.

Figure 7:
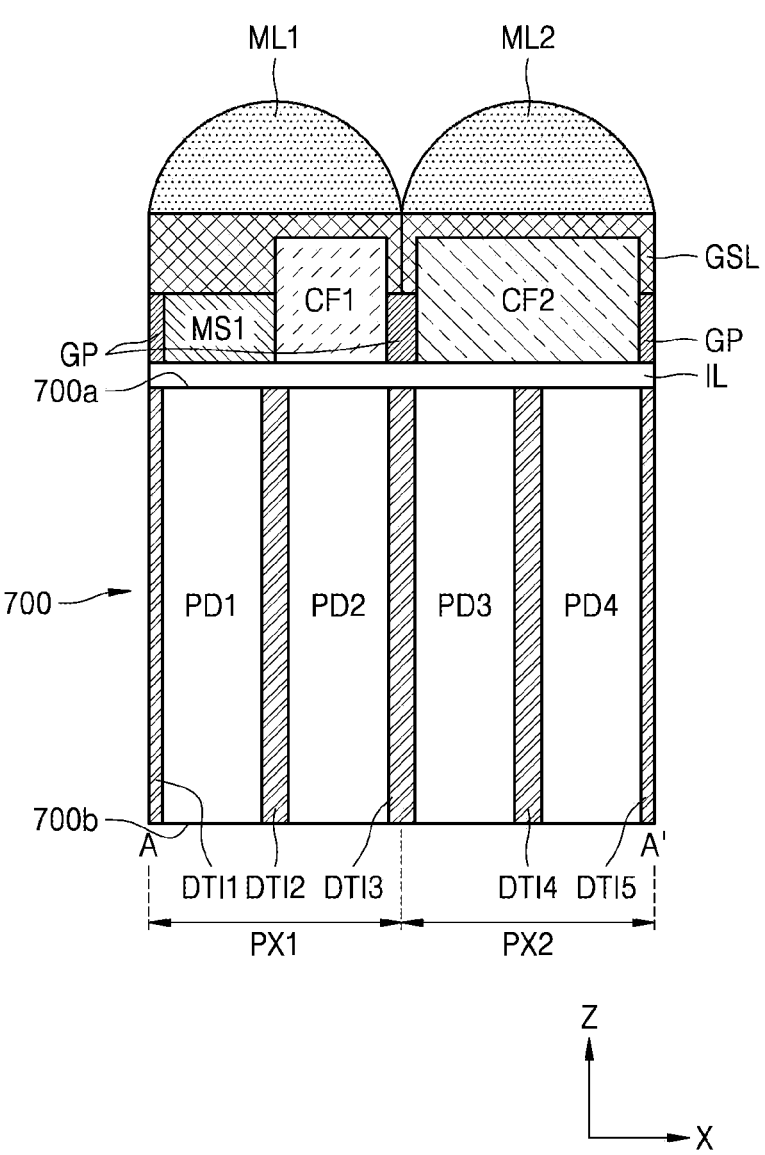
FIGS. 7 and 8 are cross-sectional views taken along line A-A' of FIG. 3 according to some example embodiments.
Figure 8:
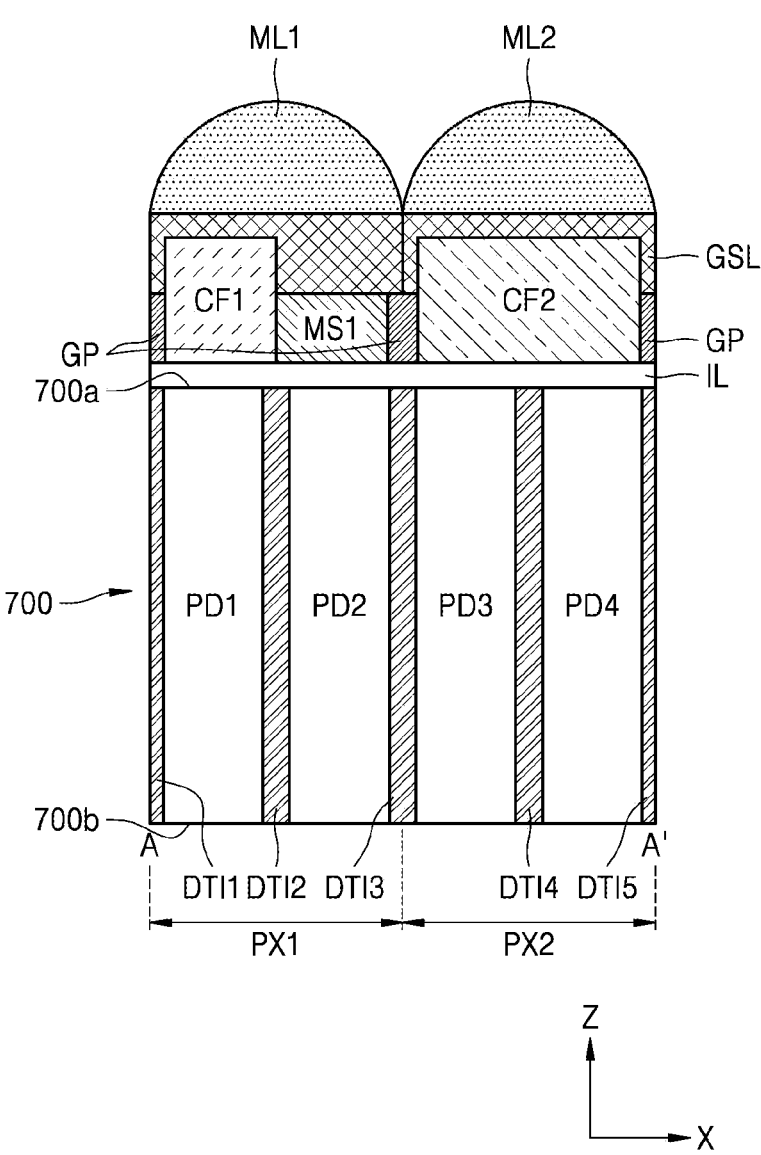

FIGS. 7 and 8 are cross-sectional views taken along line A-A' of FIG. 3 according to some example embodiments. FIGS. 7 and 8 are detailed cross-sectional views illustrating pixels, and description previously given with reference to FIG. 6 is omitted and a description is made below.

Referring to FIGS. 7 and 8, the image sensor 100 may be provided in a semiconductor substrate 700 in which a first pixel PX1 and a second pixel PX2 are formed. A first photodiode PD1, a second photodiode PD2, a third photodiode PD3, and a fourth photodiode PD4 may be arranged within the semiconductor substrate 700, for example such that the plurality of photodiodes are at least partially overlapping each other in an in-plane direction of the semiconductor substrate 700 (e.g., the first direction X and/or the second direction Y). The plurality of photodiodes PD1, PD2, PD3, and PD4 may be separated from each other (e.g., isolated from each other, isolated from direction contact with each other, etc.) by a plurality of device isolation films DTI1, DTI2, DTI3, and DTI4. From a plan view, the plurality of device isolation films DTI1, DTI2, DTI3, and DTI4 may be arrayed side by side in a first direction X (first horizontal direction).

Referring to FIGS. 7 and 8, the detailed cross-sectional views illustrating the first pixel PX1 and the second pixel PX2 are disclosed. The first pixel PX1 may include the first photodiode PD1, the second photodiode PD2, a first metal shield MS1, a first color filter CF1, a first micro lens ML1, the first device isolation film DTI1, and the second device isolation film DTI2. The second pixel PX2 may include the third photodiode PD3, the fourth photodiode PD4, a second color filter CF2, a second micro lens ML2, the fourth device isolation film DTI4, and the fifth device isolation film DTI5. The third device isolation film DTI3 may be arranged between the first pixel PX1 and the second pixel PX2. The first device isolation film DTI1, the second device isolation film DTI2, and the third device isolation film DTI3 may be spaced apart at equal or substantially equal intervals (e.g., equal or substantially equal distances) from each other in the first direction X and/or the second direction Y, for example as shown in FIGS. 7 and 8.

The first photodiode PD1 and the second photodiode PD2 may be arranged within the first pixel PX1. The first photodiode PD1 and the second photodiode PD2 may be arranged to be spaced apart in the first direction X within the semiconductor substrate 700. One face of the first photodiode PD1 may be surrounded (e.g., covered) by the first device isolation film DTI1. The second device isolation film DTI2 may be arranged between the first photodiode PD1 and the second photodiode PD2. The first photodiode PD1 and the second photodiode PD2 may be physically separated by the second device isolation film DTI2. The third photodiode PD3 and the fourth photodiode PD4 may be arranged within the second pixel PX2. The third photodiode PD3 and the fourth photodiode PD4 may be arranged to be spaced apart in the first direction X within the semiconductor substrate. The fourth device isolation film DTI4 may be arranged between the third photodiode PD3 and the fourth photodiode PD4. The third photodiode PD3 and the fourth photodiode PD4 may be physically separated by the fourth device isolation film DTI4. One face of the fourth photodiode PD4 may be surrounded (e.g., covered) by the fifth device isolation film DTI5.

The first pixel PX1 and the second pixel PX2 may include a grid pattern GP for separating respective pixel regions. For example, the grid pattern GP may be disposed over (e.g., on in the third direction Z which is also interchangeably referred to herein as a vertical direction, to at least partially overlap in the third direction Z) the first device isolation film DTI1, the third device isolation film DTI3, and the fifth device isolation film DTI5 for distinguishing between the first pixel PX1 and the second pixel PX2. According to some example embodiments, the grid pattern GP may be disposed on a grid structure region GSL (e.g., on in the third direction Z which is also interchangeably referred to herein as a vertical direction, to at least partially overlap in the third direction Z). For example, the grid pattern GP may be formed of a metal film such as tungsten (W), aluminum (Al), copper (Cu), titanium (Ti), molybdenum (Mo), or nickel (Ni). The grid pattern GP and the metal shield MS1, MS2 may be made of the same substance or material.

The device isolation films DTI1, DTI2, DTI3, DTI4, and DTI5 may be formed within the semiconductor substrate. The device isolation films DTI1, DTI2, DTI3, DTI4, and DTI5 may be formed of an insulating material having a refractive index less than that of the semiconductor substrate. For example, the device isolation films DTI1, DTI2, DTI3, and DTI4 may be made of a silicon oxide (SiO$_2$), a silicon nitride (SiN), undoped polysilicon, air, or a combination thereof. In embodiments, the device isolation films DTI1, DTI2, DTI3, DTI4, and DTI5 may be formed in various methods such as front deep trench isolation (FDTI), backside deep trench isolation (BDTI), and hybrid deep trench isolation (HDTI). The device isolation films DTI1, DTI2, DTI3, DTI4, and DTI5 may refract incident light incident on the photodiodes PD1, PD2, PD3, and PD4.

An insulating layer IL may be arranged between the semiconductor substrate and the first metal shield MS1, the first color filter CF1, and the second color filter CF2. The insulating layer IL may cover any one face of the semiconductor substrate. As an example, the insulating layer IL may have an anti-reflection film function. For example, the insulating layer IL may include at least one of a silicon oxide film, a silicon nitride film, a silicon oxy-nitride film, and a hafnium oxide film.

Referring to FIG. 7, the first metal shield MS1 may be arranged between the first photodiode PD1 of the semiconductor substrate and the first micro lens ML1. In some example embodiments, the first metal shield MS1 shown in FIG. 7 may be disposed over the first photodiode PD1 and thus may correspond to the left photodiode LPD shown in FIG. 3. For example, the first metal shield MS1 may be on the first photodiode PD1 in the third direction Z, for example at least partially overlapping the first photodiode PD1 in the third direction Z, where the third direction Z may also be referred to interchangeably as a vertical direction and which may extend perpendicular to the first and/or second directions X and/or Y and which may be perpendicular to an in-plane direction of the semiconductor substrate 700, perpendicular to a top surface 700a of the semiconductor substrate 700, perpendicular to a bottom surface 700b of the semiconductor substrate 700, or any combination thereof. The first metal shield MS1 may block light incident through the first micro lens ML1 and toward at least the first photodiode PD1 (e.g., light incident through the first micro-lens ML1 at least partially in the −Z direction as shown). For example, the first metal shield MS1 may be formed of a metal film such as tungsten (W), aluminum (Al), copper (Cu), titanium (Ti), molybdenum (Mo), or nickel (Ni).

The first color filter CF1 may be arranged between (e.g., in the third direction Z) the second photodiode PD2 of the semiconductor substrate 700 and the first micro lens ML1. The first color filter CF1 may be arranged to correspond to the first pixel PX1. The second color filter CF2 may be arranged between (e.g., in the third direction Z) both the third photodiode PD3 and fourth photodiode PD4 of the semiconductor substrate 700 and the second micro lens ML2. The second color filter CF2 may be arranged to correspond to the second pixel PX2. In some example embodiments, one color filter may vertically overlap photodiodes arranged within one pixel. As a result, the first metal shield MS1 may be on one photodiode (e.g., first photodiode PD1) of the photodiodes of the first pixel PX1 in the third direction Z (e.g., at least partially overlapping in the third direction Z) and the first color filter CF1 may be on another photodiode (e.g., second photodiode PD2) of the first pixel PX1 in the third direction Z (e.g., at least partially overlapping in the third direction Z), while the second color filter may be on both the third and fourth photodiodes PD3 and PD4 in the third direction Z (e.g., at least partially overlapping in the third direction Z). The first color filter CF1 and the second color filter CF2 may each include one or more of a green filter, a blue filter, and/or a red filter. The first color filter CF1 and the second color filter CF2 may be arrayed in a Bayer pattern. For example, the image sensor 100 may include a Bayer pattern of color filters, the Bayer pattern including the first color filter CF1 and the second color filter CF2, the Bayer pattern including a green color filter, a red color filter, and a blue color filter, such that the first color filter CF1 is one filter of the green color filter, the red color filter, or the blue color filter, and the second color filter CF2 is another filter of the green color filter, the red color filter, or the blue color filter. The Bayer pattern is a method of arraying the green filter, to which the human eye is most sensitive, to become half of the entire filter.

Referring to FIG. 7, light incident in the right direction (e.g., inclined in the +X direction in FIG. 7) on the center of the first micro lens ML1 (e.g., incident light that is inclined in relation to the top surface 700a of the semiconductor substrate 700, for example defining an angle with the third direction Z, and thus inclined in relation to the first photodiode PD1) may form no image on the first photodiode PD1 because a path of the incident light (e.g., a path through and/or from the first micro lens ML1 to the first photodiode PD1) is blocked by the first metal shield MS1 and also, light incident in the left direction (e.g., inclined in the −X direction in FIG. 7) on the center of the first micro lens ML1 may form no image on the first photodiode PD1 because a path of the incident light (e.g., a path of incident light passing through the first micro lens ML1 towards the first photodiode PD1) is blocked by the first metal shield MS1. Accordingly, the first metal shield MS1 may be configured to block incident light passing through the first metal shield MS1 from being incident on the first photodiode PD1, where such incident light, passing through the first micro lens ML1 in the −Z direction, is further directed in the −X or +X direction (e.g., incident in the right direction or the left direction) and thus is inclined in relation to the first photodiode PD1 and/or the first metal shield MS1. It will also be understood that "inclined" incident light as described herein may include incident light that follows a path extending in a direction extends through a micro lens towards a photodiode (e.g., and is different from the third direction Z (e.g., is angled in relation to the third direction Z). The light incident in the right direction and the left direction on the center of the first micro lens ML1 may pass through the first color filter CF1 and form an image on the second photodiode PD2 (e.g., may be incident on the second photodiode PD2 such that the second photodiode PD2 absorbs at least a portion of the incident light). The light incident in the right direction on the center of the second micro lens ML2 may pass through the second color filter CF2 and form an image on the third photodiode PD3, and the light incident in the left direction on the center of the second micro lens ML2 may pass through the second color filter CF2 and form an image on the fourth photodiode PD4.

Accordingly, the image sensor 100 according to some example embodiments may include the pixels PX1 and PX2 including the two photodiodes PD1, PD2, PD3, and PD4. The first pixel PX1 may form (e.g., may include) the first metal shield MS1 over (e.g., on, for example at least partially overlapping in the third direction Z) the first photodiode PD1 and may form (e.g., may include) the first color filter CF1 over (e.g., on, for example at least partially overlapping in the third direction Z) the second photodiode PD2. The first metal shield MS1 may block paths of light incident in various directions (e.g., directed in the −Z direction and further directed, or inclined, in one or more of the first direction X and/or the second direction Y). As shown, the second pixel PX2 may not include any metal shield, and thus incident light passing through the second micro lens ML2 to the second color filter CF2 may not be blocked by any metal shield from reaching (and forming respective images on) the third and fourth photodiodes PD3 and PD4. AF may be implemented by reflecting a phase difference of an image that is formed on the third photodiode PD3 or the fourth photodiode PD4 by the incident light passing through the second color filter CF2 of the second pixel PX2. That is, the image sensor 100 may receive image information according to pixel signals generated by the second photodiode PD2 of the first pixel PX1 and the third photodiode PD3 and fourth photodiode PD4 of the second pixel PX2 and perform phase difference computation, thereby improving an AF speed of the image sensor 100 and reducing power consumption by the image sensor 100 to perform such AF operation, thereby improving functionality of the image sensor 100.

Referring to FIG. 8, the first metal shield MS1 may be arranged between the second photodiode PD2 of the semiconductor substrate and the first micro lens ML1. In some example embodiments, the first metal shield MS1 shown in FIG. 8 may be disposed over (e.g., on, for example at least partially overlapping in the third direction Z) the second photodiode PD2 and thus may correspond to the right photodiode RPD shown in FIG. 3.

Light incident in the right direction (e.g., inclined in the +X direction in FIG. 7) on the center of the first micro lens ML1 (e.g., incident light that is inclined in relation to the top surface 700*a* of the semiconductor substrate 700, for example defining an angle with the third direction Z, and thus inclined in relation to the first photodiode PD1) may form no image on the second photodiode PD2 because a path of the incident light (e.g., a path through and/or from the first micro lens ML1 to the first photodiode PD1) is blocked by the first metal shield MS1, and light incident in the left direction (e.g., inclined in the −X direction in FIG. 7) on the center of the first micro lens ML1 may form no image on the second photodiode PD2 because a path of the incident light (e.g., incident light passing through the first micro lens ML1 towards the second photodiode PD2) is blocked by the first metal shield MS1. Accordingly, the first metal shield MS1 may be configured to block incident light passing through the first micro lens ML1 from being incident on the second photodiode PD2, where such incident light, passing through the first micro lens ML1 in the −Z direction, is further directed in the −X or +X direction (e.g., incident in the right direction or the left direction) and thus is inclined in relation to the second photodiode PD2 and/or the first metal shield MS1. The light incident in the right direction and the left direction on the center of the first micro lens ML1 may pass through the first color filter CF1 and form an image on the first photodiode PD1 (e.g., may be incident on the first photodiode PD1 such that the first photodiode PD1 absorbs at least a portion of the incident light). The light incident in the right direction on the center of the second micro lens ML2 may pass through the second color filter CF2 and form an image on the third photodiode PD3, and the light incident in the left direction on the center of the second micro lens ML2 may pass through the second color filter CF2 and form an image on the fourth photodiode PD4.

Accordingly, the image sensor 100 according to some example embodiments may include the pixels PX1 and PX2 each including the two photodiodes PD1, PD2, PD3, and PD4. The first pixel PX1 may form (e.g., may include) the first color filter CF1 over (e.g., on, for example at least partially overlapping in the third direction Z) the first photodiode PD1, and may form the first metal shield MS1 over (e.g., on, for example at least partially overlapping in the third direction Z) the second photodiode PD2. The first metal shield MS1 may block paths of light incident in various directions (e.g., directed in the −Z direction and further directed, or inclined, in one or more of the first direction X and/or the second direction Y). As shown, the second pixel PX2 may not include any metal shield, and thus incident light passing through the second micro lens ML2 to the second color filter CF2 may not be blocked by any metal shield from reaching (and forming respective images on) the third and fourth photodiodes PD3 and PD4. AF may be implemented by reflecting a phase difference of an image that is formed on the third photodiode PD3 or the fourth photodiode PD4 by the incident light passing through the second color filter CF2 of the second pixel PX2. That is, the image sensor 100 may receive image information according to pixel signals generated by the first photodiode PD1 of the first pixel PX1 and the third photodiode PD3 and fourth photodiode PD4 of the second pixel PX2 and perform phase difference computation, thereby improving an AF speed of the image sensor 100 and reducing power consumption by the image sensor 100 to perform such AF operation, thereby improving functionality of the image sensor 100.

In an image sensor according to some example embodiments, one pixel may include two photodiodes. A metal shield may be formed over (e.g., on, for example at least partially overlapping in the third direction Z) one of the two photodiodes, and a color filter may be formed over (e.g., on, for example at least partially overlapping in the third direction Z) the other photodiode. The metal shield may block incident light.

That is, the image sensor according to some example embodiments may receive image information according to pixel signals of photodiodes including no metal shield and perform phase difference computation, thereby improving an AF speed, and reducing the power consumption of the image sensor.

Figure 9:
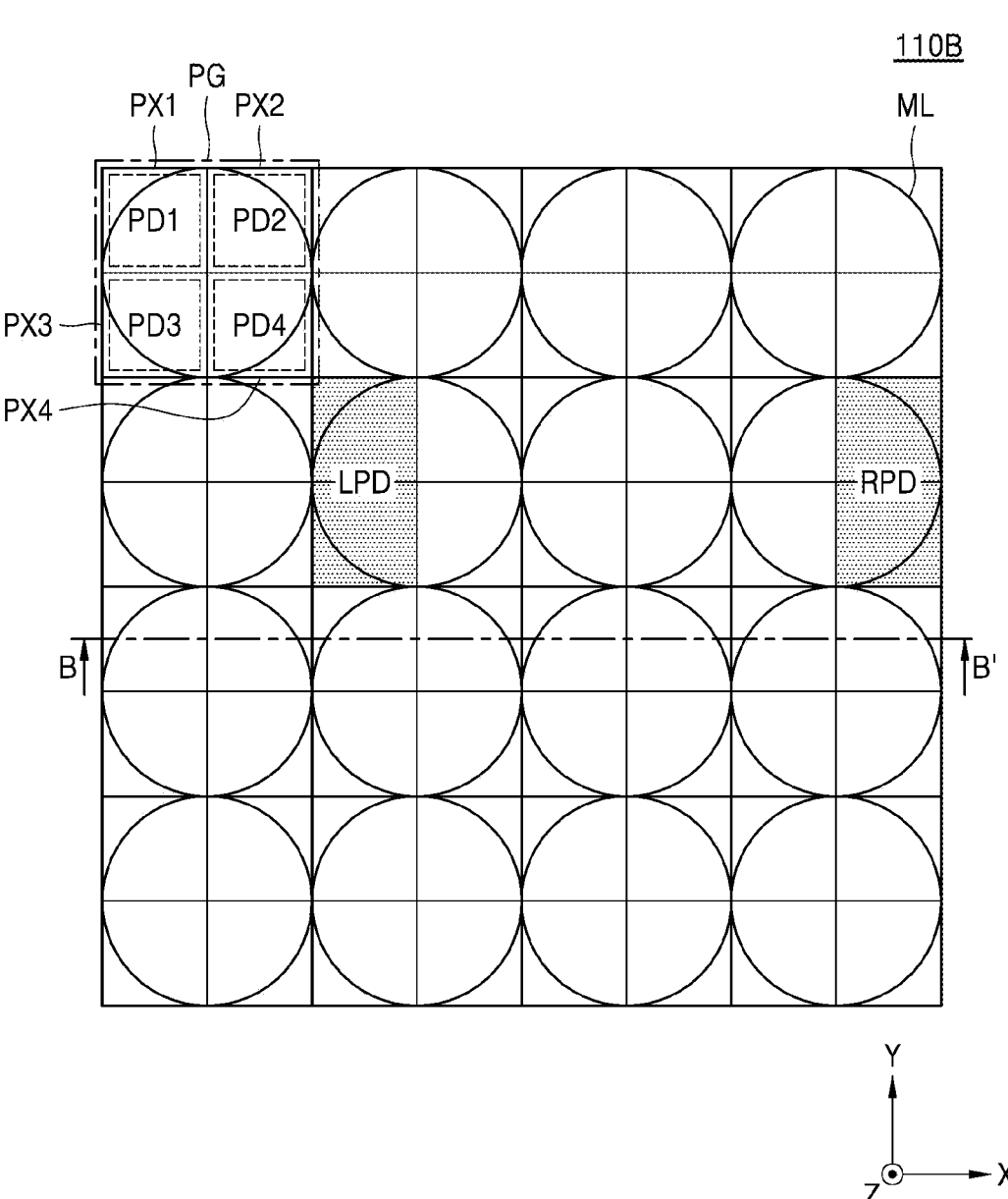
FIG. 9 is a diagram illustrating a pixel array of an image sensor according to some example embodiments.

FIG. 9 is a diagram illustrating a pixel array 110B of an image sensor according to some example embodiments.

Referring to FIG. 9, the pixel array 110B may include a plurality of pixels PX1, PX2, PX3, and PX4 arranged in a first direction X and a second direction Y. The first direction X and the second direction Y may include directions horizontal to a semiconductor substrate in which the pixel array 110B is formed. The plurality of pixels PX1, PX2, PX3, and PX4 may include AF pixels.

A pixel group PG may include a micro lens 210, the first pixel PX1, the second pixel PX2, the third pixel PX3, and the fourth pixel PX4. The first pixel PX1 may be arranged at the top-left within the pixel group PG, and the second pixel PX2 may be arranged at the top-right within the pixel group PG. The third pixel PX3 may be arranged at the bottom-left of the pixel group PG, and the fourth pixel PX4 may be arranged at the bottom-right of the pixel group PG. In other words, the first pixel PX1 and the second pixel PX2, and the third pixel PX3 and the fourth pixel PX4 may be arranged side by side in the X direction, and the first pixel PX1 and the third pixel PX3, and the second pixel PX2 and the fourth pixel PX4 may be arranged side by side in the Y direction.

The first pixel PX1, the second pixel PX2, the third pixel PX3, and the fourth pixel PX4 may each include one photodiode (e.g., one of the photodiodes PD1, PD2, PD3, and PD4).

Referring to FIG. 9, a structure in which the pixel group PG includes the four photodiodes PD1, PD2, PD3, and PD4 aligned up, down, left and right below one micro lens 210 may be referred to as a quad-cell structure.

In some example embodiments, one or more pixels of the plurality of pixels PX1, PX2, PX3, and PX4 may include a metal shield. For example, the first pixel PX1 and the third pixel PX3 may include a metal shield, and may be referred to as a left photodiode LPD. Also, for example, the second pixel PX2 and the fourth pixel PX4 may include a metal shield, and may be referred to as a right photodiode RPD. The left photodiode LPD is described with reference to FIG. 11, and the right photodiode RPD is described with reference to FIG. 12.

Figure 10:
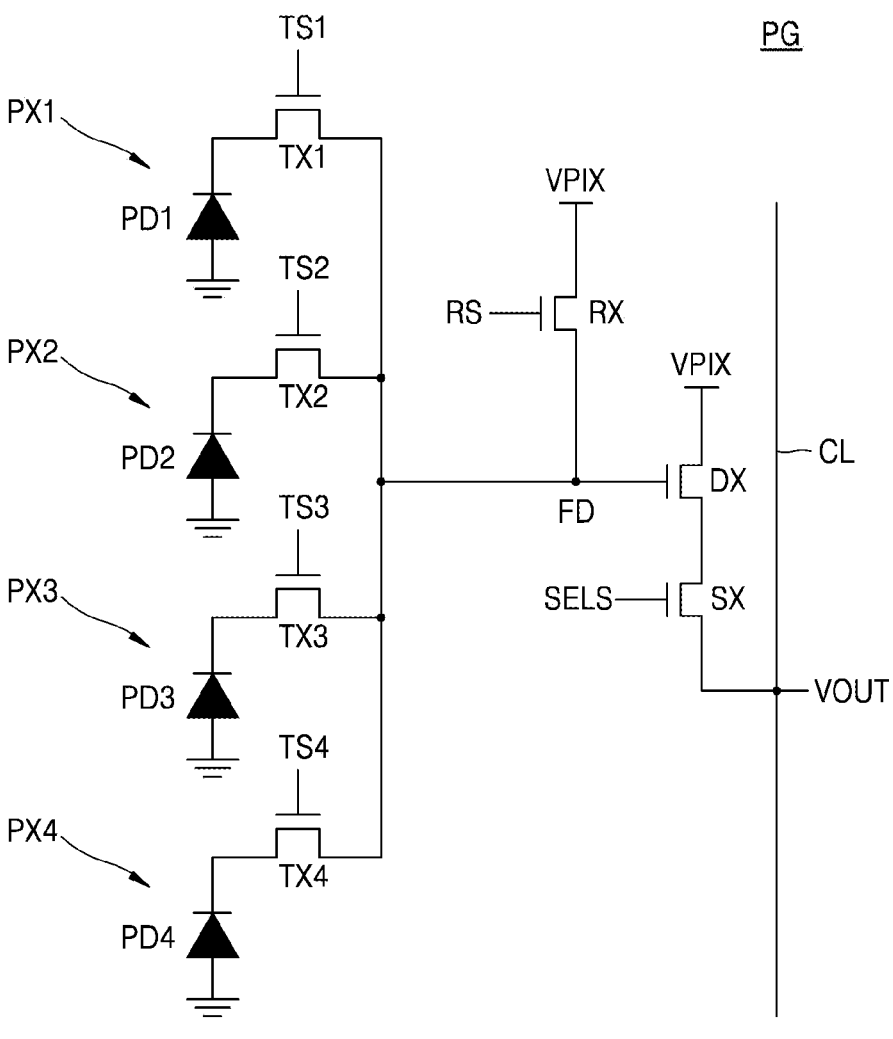
FIG. 10 is a circuit diagram illustrating a pixel included in an image sensor according to some example embodiments.

FIG. 10 is a circuit diagram illustrating a pixel group PG included in an image sensor according to some example embodiments.

Referring to FIG. 10, pixels arranged adjacent to each other in a first direction X and a second direction Y, for example, a first pixel PX1, a second pixel PX2, a third pixel PX3, and a fourth pixel PX4 may share a floating diffusion node FD with each other (e.g., may be connected to one floating diffusion node FD) and form a pixel group PG. Also, the number of pixels included in one pixel group PG may vary, and the first pixel PX1, second pixel PX2, third pixel PX3, and fourth pixel PX4 included in the pixel group PG may include AF pixels.

The pixel group PG may include the plurality of photodiodes PD1, PD2, PD3, and PD4, a plurality of transfer transistors TX1, TX2, TX3, and TX4, a selection transistor SX, a driving transistor DX, and a reset transistor RX.

Each of the plurality of photodiodes PD1, PD2, PD3, and PD4 may generate light charges that are variable depending on the intensity of light. Each of the transfer transistors TX1, TX2, TX3, and TX4 may transmit light charges generated according to transmission control signals TS1, TS2, TS3, and TS4 to the floating diffusion node FD. The generated light charges may be accumulated and stored in the floating diffusion node FD.

The pixels PX1, PX2, PX3, and PX4 constituting the pixel group PG each may include a corresponding photodiode (e.g., one of the photodiodes PD1, PD2, PD3, and PD4), and may include a corresponding transfer transistor (e.g., one of the transfer transistors TX1, TX2, TX3, and TX4). For example, the first pixel PX1 constituting the pixel group PG may include the first photodiode PD1 and the first transfer transistor TX1, the second pixel PX2 may include the second photodiode PD2 and the second transfer transistor TX2, the third pixel PX3 may include the third photodiode PD3 and the third transfer transistor TX3, and the fourth pixel PX4 may include the fourth photodiode PD4 and the fourth transfer transistor TX4.

The pixels PX1, PX2, PX3, and PX4 constituting the pixel group PG may share one floating diffusion node FD (e.g., may each be connected to the same floating diffusion node FD). The sharing concept of the pixel group PG may not only include that the plurality of photodiodes PD1, PD2, PD3, and PD4 share one floating diffusion node FD, but also include that the plurality of photodiodes PD1, PD2, PD3, and PD4 share the transistors RX, DX, and SX except for the transfer transistors TX1, TX2, TX3, and TX4. The light charges generated by each of the photodiodes PD1, PD2, PD3, and PD4 may be all accumulated in the shared floating diffusion node FD.

When the stored charges accumulated in the photodiodes PD1, PD2, PD3, and PD4 are transferred to the floating diffusion node FD, the charges may be output as a pixel signal VOUT along a column line CL via the driving transistor DX and the selection transistor SX.

One micro lens may be disposed over the plurality of photodiodes PD1, PD2, PD3, and PD4 (e.g., in the third direction Z).

Figure 11:
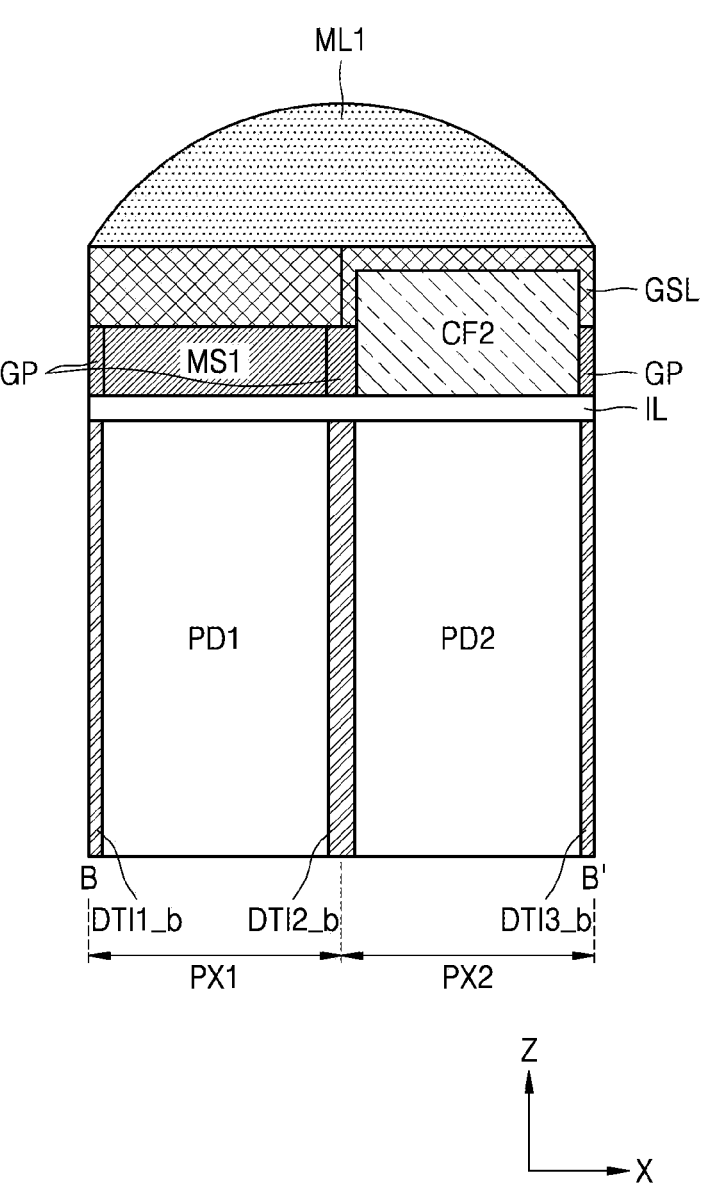
FIGS. 11 and 12 are cross-sectional views taken along line B-B' of FIG. 9 according to some example embodiments.
Figure 12:
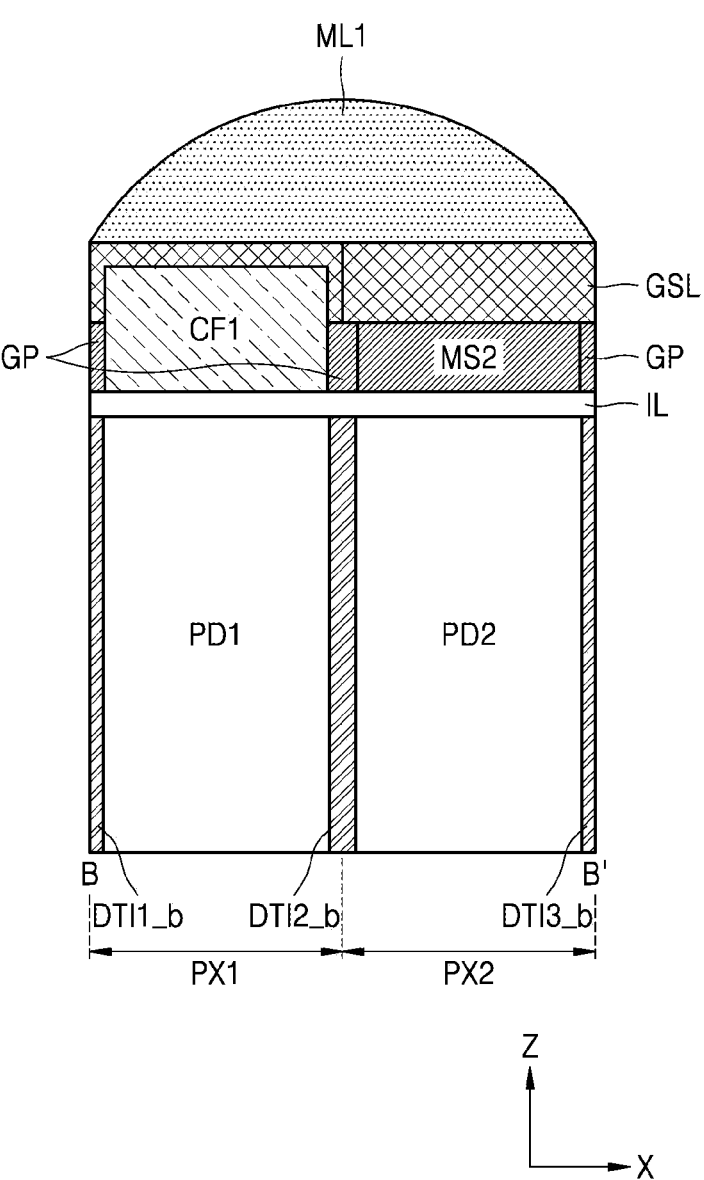

FIGS. 11 and 12 are cross-sectional views taken along line B-B' of FIG. 9. Description previously given with reference to FIGS. 5 to 8 is omitted and a description is made below.

Referring to FIGS. 11 and 12, one pixel may include one photodiode. This may be referred to as a single-photodiode (single PD). One color filter and one pixel (one photodiode) may be disposed below one micro lens (e.g., in the third direction Z).

The image sensor 100 may be provided in a semiconductor substrate in which a first pixel PX1 and a second pixel PX2 are formed. A first photodiode PD1 and a second photodiode PD2 may be arranged within the semiconductor substrate. The plurality of photodiodes PD1 and PD2 may be separated from each other by a plurality of device isolation films DTI1_b, DTI2_b, and DTI3_b. From a plan view, the plurality of device isolation films DTI1_b, DTI2_b, and DTI3_b may be arrayed side by side in a first direction X (first horizontal direction). The first device isolation film DTI1_b, the second device isolation film DTI2_b, and the third device isolation film DTI3_b may be spaced apart at equal or substantially equal intervals (e.g., equal or substantially equal distances) from each other in the first direction X and/or the second direction Y, for example as shown in FIGS. 11 and 12.

Referring to FIG. 11, a detailed cross-sectional view illustrating the first pixel PX1 and the second pixel PX2 is disclosed. The first pixel PX1 may include the first photodiode PD1, a first metal shield MS1, the first micro lens ML1, and the first device isolation film DTI1_b. The second pixel PX2 may include the second photodiode PD2, a second color filter CF2, the first micro lens ML1, and the third device isolation film DTI3_b. The second device isolation film DTI2_b may be arranged between the first pixel PX1 and the second pixel PX2.

The first pixel PX1 and the second pixel PX2 may include a grid pattern GP for separating respective pixel regions. For example, the grid pattern GP may be arranged over the first device isolation film DTI1_b, the second device isolation film DTI2_b, and the third device isolation film DTI3_b (e.g., on in the third direction Z, to at least partially overlap in the third direction Z) for distinguishing between the first pixel PX1 and the second pixel PX2.

Referring to FIG. 11, light incident in the right direction on the center of the first micro lens ML1 may form no image on the first photodiode PD1 because a path of the incident light is blocked by the first metal shield MS1, and light incident in the left direction on the center of the first micro lens ML1 may form no image on the first photodiode PD1 because a path of the incident light is blocked by the first metal shield MS1. The light incident in the right direction on the center of the first micro lens ML1 may pass through the second color filter CF2 and form an image on the second photodiode PD2, and the light incident in the left direction on the center of the first micro lens ML1 may pass through the second color filter CF2 and form an image on the second photodiode PD2.

Accordingly, the image sensor according to some example embodiments may include the first pixel PX1 and the second pixel PX2. In the first pixel PX1, the first metal shield MS1 may be formed and block paths of light incident in various directions. AF may be implemented by reflecting a phase difference of an image that is formed on the second photodiode PD2 by the incident light passing through the second color filter CF2 of the second pixel PX2. That is, the image sensor may receive image information according to a pixel signal generated by the second pixel PX2 and perform phase difference computation, thereby improving an AF speed and reducing power consumption.

Referring to FIG. 12, a detailed cross-sectional view illustrating the first pixel PX1 and the second pixel PX2 is disclosed. The first pixel PX1 may include the first photodiode PD1, a first color filter CF1, the first micro lens ML1, and the first device isolation film DTI1_b. The second pixel PX2 may include the second photodiode PD2, a second metal shield MS2, the first micro lens ML1, and the third device isolation film DTI3_b. The second device isolation film DTI2_b may be arranged between the first pixel PX1 and the second pixel PX2.

Referring to FIG. 12, light incident in the right direction on the center of the first micro lens ML1 may pass through the first color filter CF1 and form an image on the first photodiode PD1, and light incident in the left direction on the center of the first micro lens ML1 may pass through the first color filter CF1 and form an image on the first photodiode PD1. The light incident in the right direction on the center of the first micro lens ML1 may form no image on the second photodiode PD2 because a path of the incident light is blocked by the metal shield MS2, and the light incident in the left direction on the center of the first micro lens ML1 may form no image on the second photodiode PD2 because a path of the incident light is blocked by the second metal shield MS2.

Accordingly, the image sensor according to some example embodiments may include the first pixel PX1 and the second pixel PX2. In the second pixel PX2, the second metal shield MS2 may be formed and block paths of light incident in various directions. AF may be implemented by reflecting a phase difference of an image that is formed on the first photodiode PD1 by the incident light passing through the first color filter CF1 of the first pixel PX1. That is, the image sensor may receive image information according to a pixel signal generated by the first pixel PX1 and perform phase difference computation, thereby improving an AF speed of the image sensor 100 and reducing power consumption by the image sensor 100 to perform such AF operation, thereby improving functionality of the image sensor 100.

Figure 13:
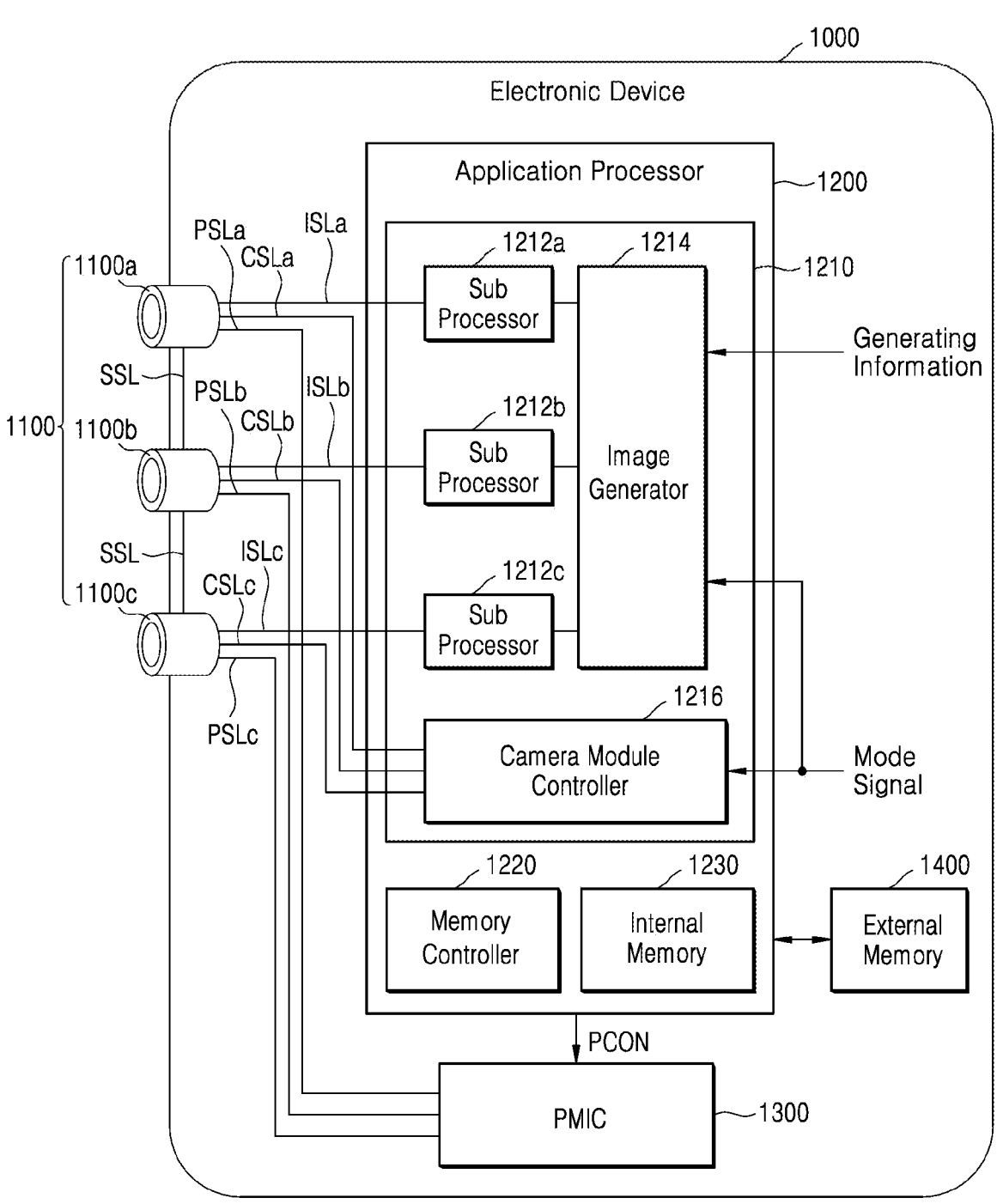
FIG. 13 is a block diagram illustrating an electronic device including a multi-camera module according to some example embodiments.
Figure 14:
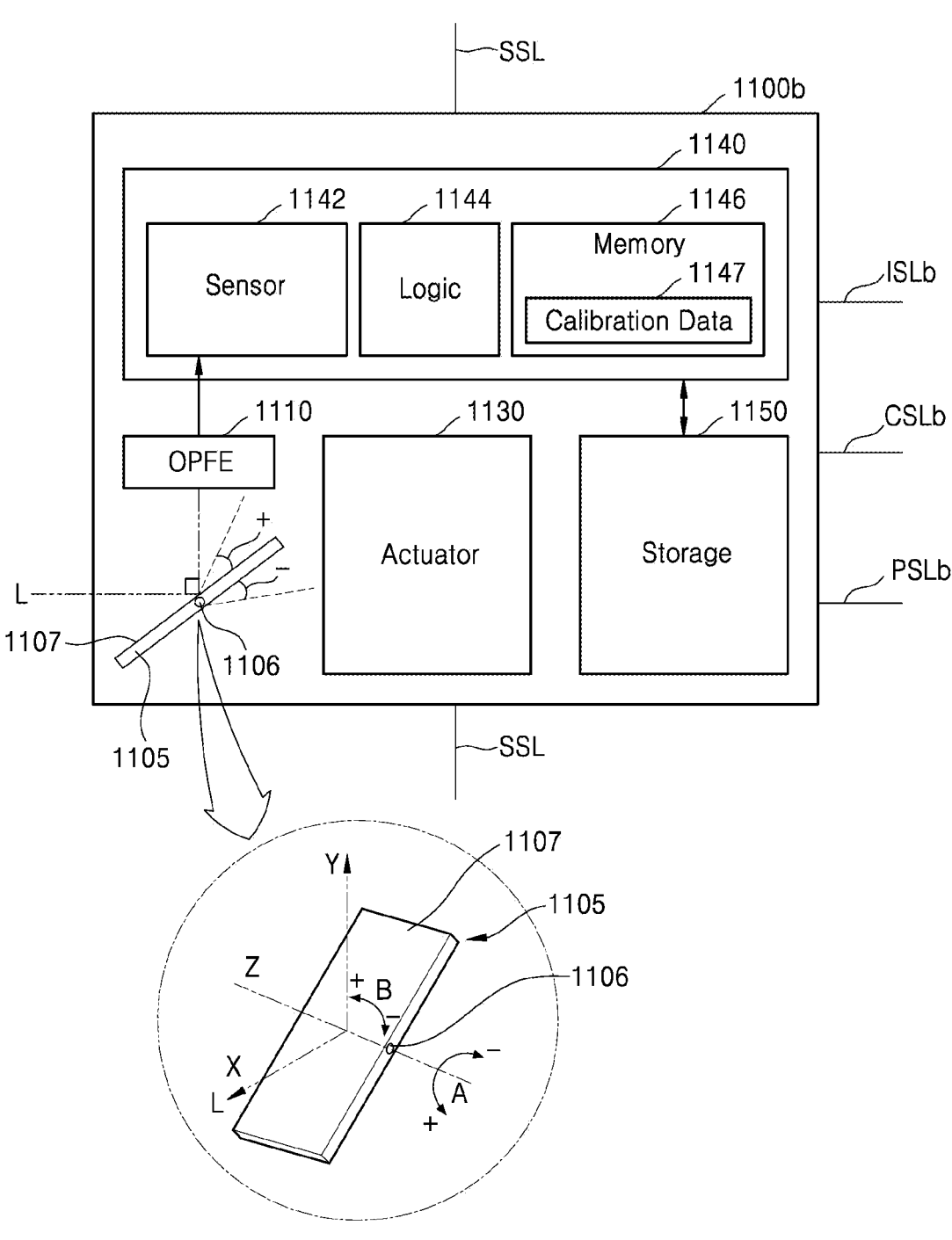
FIG. 14 is a detailed block diagram illustrating the camera module of FIG. 13 according to some example embodiments.

FIG. 13 is a block diagram illustrating an electronic device 1000 including a multi-camera module according to some example embodiments. FIG. 14 is a detailed block diagram illustrating the camera module of FIG. 13 according to some example embodiments.

Referring to FIG. 13, the electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although some example embodiments in which three camera modules 1100a, 1100b, and 1100c are arranged is shown in the drawing, embodiments are not limited thereto. In some example embodiments, the camera module group 1100 may be modified to include only two camera modules. Also, in some example embodiments, the camera module group 1100 may be modified to include k camera modules ('k' is a natural number of 4 or more).

A detailed construction of the camera module 1100b is described below in more detail with reference to FIG. 14, but the following description may be also identically applied to the other camera modules 1100a and 1100c according to some example embodiments.

Referring to FIG. 14, the camera module 1100b may include a prism 1105, an optical path folding element OPFE 1110, an actuator 1130, an image sensing device 1140, and a storage unit 1150.

The prism 1105 may include a reflective surface 1107 of a light reflecting material and change a path of light L incident from the outside.

In some example embodiments, the prism 1105 may change the path of light L incident in a first direction X to a second direction Y vertical to the first direction X. Also, the prism 1105 may rotate the reflective surface 1107 of the light reflecting material in an A direction about a central axis 1106, or may rotate the central axis 1106 in a B direction and change the path of light L incident in the first direction X to the second direction Y vertical to the first direction X. At this time, the OPFE 1110 may also move in a third direction Z vertical to the first direction X and the second direction Y.

In some example embodiments, as illustrated, a maximum rotation angle of the prism 1105 in the A direction may include about 15 degrees or less in the plus (+) A direction and include greater than about 15 degrees in the minus (−) A direction, but the example embodiments are not limited thereto.

In some example embodiments, the prism 1105 may move about 20 degrees, or between about 10 degrees and about 20 degrees, or between about 15 degrees and about 20 degrees in the plus (+) or minus (−) B direction. Here, regarding the movement angle, the prism 1105 may move at the same angle in the plus (+) or minus (−) B direction, or may move up to an almost similar angle having a tolerance range of about 1 degree.

In some example embodiments, the prism 1105 may move the reflective surface 1107 of the light reflecting material in the third direction (e.g., Z direction) parallel to an extension direction of the central axis 1106.

The OPFE 1110 may include, for example, optical lenses comprised of m groups (where m is a natural number). The m optical lenses may move in the second direction Y and change an optical zoom ratio of the camera module 1100b. For example, assuming that a basic optical zoom ratio of the camera module 1100b is Z, the optical zoom ratio of the camera module 1100b may be changed to an optical zoom ratio of 3Z or an optical zoom ratio of 5Z or more, when the m optical lenses included in the OPFE 1110 are moved.

The actuator 1130 may move the OPFE 1110 or the optical lens to a specific position. For example, the actuator 1130 may adjust the position of the optical lens so that the image sensor 1142 is located at a focal length of the optical lens for the purpose of accurate sensing.

The image sensing device 1140 may include the image sensor 1142, a control logic 1144, and a memory 1146. The image sensor 1142 may sense an image of a sensing object by using light L provided through the optical lens. Descriptions given with reference to FIGS. 1 to 12 may be applied to the image sensor 1142. The image sensor 1142 may include a plurality of pixels, and in some example embodiments, one of the plurality of pixels may include no color filter. For example, one pixel may include a metal shield instead of the color filter, and the remaining pixels may include color filters. Since the metal shield of one pixel may block incident light, the image sensor 1142 may perform an AF function by using phase signals output from the respective remaining pixels.

The control logic 1144 may control the overall operation of the camera module 1100b. For example, the control logic 1144 may control the operation of the camera module 1100b according to a control signal provided through a control signal line CSLb.

The memory 1146 may store information necessary for the operation of the camera module 1100b, such as calibration data 1147. The calibration data 1147 may include information necessary for the camera module 1100b to generate image data by using light L provided from the outside. The calibration data 1147 may include, for example, information about the degree of rotation, information about the focal length, information about the optical axis, etc. described above. When the camera module 1100b is implemented as a multi-state camera of which a focal length changes depending on the position of an optical lens, the calibration data 1147 may include a focal length value for each position (or state) of the optical lens and information related to auto focusing.

The storage unit 1150 may store image data sensed through the image sensor 1142. The storage unit 1150 may be arranged outside the image sensing device 1140, and may be implemented in a form stacked with a sensor chip constituting the image sensing device 1140.

In some example embodiments, the storage unit 1150 may be implemented as electrically erasable programmable read-only memory (EEPROM), but the example embodiments are not limited thereto. In some example embodiments, the image sensor 1142 may be comprised of a pixel array, and the control logic 1144 may include an analog-to-digital converter (ADC) and an image signal processor for processing a sensed image.

Referring to FIGS. 13 and 14 together, in some example embodiments, each of the plurality of camera modules 1100a, 1100b, and 1100c may include the actuator 1130. Accordingly, each of the plurality of camera modules 1100a, 1100b, and 1100c may include the same or different calibration data 1147 according to the operation of the actuator 1130 included therein.

In some example embodiments, among the plurality of camera modules 1100a, 1100b, and 1100c, one camera module (e.g., 1100b) may include a camera module of a folded lens form including the prism 1105 and the OPFE 1110 described above, and the remaining camera modules (e.g., 1100a and 1100b) may include camera modules of a vertical form not including the prism 1105 and the OPFE 1110, but the example embodiments are not limited thereto.

Among the plurality of camera modules 1100a, 1100b, and 1100c, one camera module (e.g., 1100c) may include the digital imaging device 1 shown in FIG. 1.

A camera module according to some example embodiments may include an image sensor that performs an AF function. The image sensor may include a pixel including two photodiodes. One photodiode of the pixel may include a metal shield instead of a color filter. Since the metal shield may block incident light, the image sensor may perform the AF function by using a phase signal output from the remaining photodiode. That is, the image sensor may include the pixel including the metal shield, and may receive image information according to a pixel signal generated by the photodiode including no metal shield and perform phase difference computation, thereby improving an AF speed and reducing the power consumption of the image sensor.

In some example embodiments, among the plurality of camera modules 1100a, 1100b, and 1100c, at least two camera modules (e.g., 1100a and 1100b) may have different fields of view (viewing angles). In this case, for example, optical lenses of the at least two camera modules (e.g., 1100a and 1100b) among the plurality of camera modules 1100a, 1100b, and 1100c may be different from each other, but are not limited thereto.

Also, in some example embodiments, each of the plurality of camera modules 1100a, 1100b, and 1100c may have a different viewing angle. For example, the camera module 1100a may include an ultrawide camera, the camera module 1100b may include a wide camera, and the camera module 1100c may include a tele camera, but are not limited thereto. In this case, optical lenses included in each of the plurality of camera modules 1100a, 1100b, and 1100c may also be different from each other, but are not limited thereto.

In some example embodiments, each of the plurality of camera modules 1100a, 1100b, and 1100c may be arranged to be physically separated from each other. That is, the plurality of camera modules 1100*a*, 1100*b*, and 1100*c* do not divide and use a sensing region of one image sensor 1142, but an independent image sensor 1142 may be arranged within each of the plurality of camera modules 1100*a*, 1100*b*, and 1100*c*.

Referring again to FIG. 13, the application processor 1200 may include an image processing device 1210, a memory controller 1220, and an internal memory 1230. The application processor 1200 may be implemented separately from the plurality of camera modules 1100*a*, 1100*b*, and 1100*c*. For example, the application processor 1200 and the plurality of camera modules 1100*a*, 1100*b*, and 1100*c* may be implemented separately as separate semiconductor chips.

The image processing device 1210 may include a plurality of sub processors 1212*a*, 1212*b*, and 1212*c*, an image generator 1214, and a camera module controller 1216.

The image processing device 1210 may include the plurality of sub processors 1212*a*, 1212*b*, and 1212*c* corresponding to the number of the plurality of camera modules 1100*a*, 1100*b*, and 1100*c*.

Image data generated from the respective camera modules 1100*a*, 1100*b*, and 1100*c* may be provided to the corresponding sub processors 1212*a*, 1212*b*, and 1212*c* through separated image signal lines ISLa, ISLb, and ISLc. For example, the image data generated from the camera module 1100*a* may be provided to the sub processor 1212*a* through the image signal line ISLa, the image data generated from the camera module 1100*b* may be provided to the sub processor 1212*b* through the image signal line ISLb, and the image data generated from the camera module 1100*c* may be provided to the sub processor 1212*c* through the image signal line ISLc. Such image data transmission may be performed using, for example, a camera serial interface (CSI) that is based on a mobile industry processor interface (MIPI), but the example embodiments are not limited thereto.

Meantime, in some example embodiments, one sub processor may be also arranged to correspond to a plurality of camera modules. For example, the sub processor 1212*a* and the sub processor 1212*c* are not implemented to be separated from each other as illustrated, but are implemented to be integrated into one sub processor, and image data provided from the camera module 1100*a* and the camera module 1100*c* may be selected through a selection element (e.g., multiplexer) and then be provided to the integrated sub processor. At this time, the sub processor 1212*b* is not integrated and may receive image data from the camera module 1100*b*.

Also, in some example embodiments, image data generated from the camera module 1100*a* may be provided to the sub processor 1212*a* through the image signal line ISLa, image data generated from the camera module 1100*b* may be provided to the sub processor 1212*b* through the image signal line ISLb, and image data generated from the camera module 1100*c* may be provided to the sub processor 1212*c* through the image signal line ISLc. And then, the image data processed by the sub processor 1212*b* may be directly provided to the image generator 1214, but any one of the image data processed by the sub processor 1212*a* and the image data processed by the sub processor 1212*c* may be selected through a selection element (e.g., multiplexer), etc. and then be provided to the image generator 1214.

Each of the sub processors 1212*a*, 1212*b*, and 1212*c* may perform image processing, such as bad pixel correction, 3A adjustment (auto-focus correction, auto-white balance and auto-exposure), noise reduction, sharpening, gamma control, and remosaic, for the image data provided from the camera modules 1100*a*, 1100*b*, and 1100*c*.

In some example embodiments, remosaic signal processing may be also performed by each of the camera modules 1100*a*, 1100*b*, and 1100*c* and then be provided to the sub processors 1212*a*, 1212*b*, and 1212*c*.

The image data processed by each of the sub processors 1212*a*, 1212*b*, and 1212*c* may be provided to the image generator 1214. The image generator 1214 may generate an output image by using the image data provided from each of the sub processors 1212*a*, 1212*b*, and 1212*c* in accordance with image generating information or a mode signal.

In detail, the image generator 1214 may merge at least part of image data generated from the camera modules 1100*a*, 1100*b*, and 1100*c* having different viewing angles and generate an output image, in accordance with the image generating information or mode signal. Also, the image generator 1214 may select any one of the image data generated from the camera modules 1100*a*, 1100*b*, and 1100*c* having different viewing angles and generate an output image, in accordance with the image generating information or mode signal.

In some example embodiments, the image generating information may include a zoom signal or zoom factor. Also, in some example embodiments, the mode signal may include a signal that is based on a mode selected by a user, for example.

When the image generating information is a zoom signal (zoom factor) and each of the camera modules 1100*a*, 1100*b*, and 1100*c* has a different field of view (viewing angle), the image generator 1214 may perform different operations depending on the type of the zoom signal. For example, when the zoom signal is a first signal, the image generator 1214 may generate an output image by using the image data output from the sub processor 1212*a* among the image data output from the sub processor 1212*a* and the image data output from the sub processor 1212*c*, and the image data output from the sub processor 1212*b*. When the zoom signal is a second signal different from the first signal, the image generator 1214 may generate an output image by using the image data output from the sub processor 1212*c* among the image data output from the sub processor 1212*a* and the image data output from the sub processor 1212*c*, and the image data output from the sub processor 1212*b*. When the zoom signal is a third signal different from the first signal and the second signal, the image generator 1214 does not perform such image data merging, and may select any one of the image data output from the respective sub processors 1212*a*, 1212*b*, and 1212*c* and generate an output image. However, the example embodiments are not limited to this, and a method of processing the image data may be modified and implemented as necessary.

In some example embodiments, the image processing device 1210 may further include a selection unit that selects the output of the sub processors 1212*a*, 1212*b*, and 1212*c* and transfers the selected output to the image generator 1214.

In this case, the selection unit may perform different operations depending on the zoom signal or zoom factor. For example, when the zoom signal is a fourth signal (for example, when a zoom ratio is a first ratio), the selection unit may select any one of the outputs of the sub processors 1212*a*, 1212*b*, and 1212*c* and transfer the selected output to the image generator 1214.

Also, when the zoom signal is a fifth signal different from the fourth signal (for example, when the zoom ratio is a second ratio), the selection unit may sequentially transfer p outputs (p is a natural number of 2 or more) among the outputs of the sub processors 1212a, 1212b, and 1212c to the image generator 1214. For example, the selection unit may sequentially transfer the outputs of the sub processor 1212b and the sub processor 1212c to the image generator 1214. Also, the selection unit may sequentially transfer the outputs of the sub processor 1212a and the sub processor 1212b to the image generator 1214. The image generator 1214 may generate one output image by merging the p outputs sequentially provided.

Here, image processing, such as demosaic, down scaling to a video/preview resolution size, gamma correction, and high dynamic range (HDR) processing, may be previously performed by the sub processors 1212a, 1212b, and 1212c, and then processed image data may be transferred to the image generator 1214. Therefore, the image merging operation of the image generator 1214 may be performed at high speed, even though the processed image data is provided to the image generator 1214 by one image signal line ISLa, ISLb or ISLc through the selection unit.

In some example embodiments, the image generator 1214 may receive a plurality of image data having different exposure time from at least one of the plurality of sub processors 1212a, 1212b, and 1212c, and perform high dynamic range (HDR) processing for the plurality of image data, thereby generating merged image data of which a dynamic range is increased.

A camera module controller 1216 may provide a control signal to each of the camera modules 1100a, 1100b, and 1100c. The control signal generated from the camera module controller 1216 may be provided to the corresponding camera modules 1100a, 1100b, and 1100c through separated control signal lines CSLa, CSLb, and CSLc.

Any one (e.g., 1100b) of the plurality of camera modules 1100a, 1100b, and 1100c is specified as a master camera in accordance with image generating information including a zoom signal, or a mode signal, and the remaining camera modules (e.g., 1100a and 1100c) may be specified as slave cameras. This information may be included in a control signal and be provided to the corresponding camera modules 1100a, 1100b, and 1100c through the separated control signal lines CSLa, CSLb, and CSLc.

The camera modules operating as the master and the slave may be changed depending on a zoom factor or an operation mode signal. For example, when the camera module 1100a has a greater viewing angle than the camera module 1100b, and a zoom factor indicates a lower zoom ratio, the camera module 1100b may operate as the master, and the camera module 1100a may operate as the slave. To the contrary, when the zoom factor indicates a higher zoom ratio, the camera module 1100a may operate as the master and the camera module 1100b may operate as the slave.

In some example embodiments, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving the sync enable signal may generate a sync signal, based on the received sync enable signal, and transmit the generated sync signal to the camera modules 1100a and 1100c through a sync signal line SSL. The camera module 1100b and the camera modules 1100a and 1100c may be synchronized to this sync signal and transmit image data to the application processor 1200.

In some example embodiments, a control signal provided from the camera module controller 1216 to the plurality of camera modules 1100a, 1100b, and 1100c may include mode information dependent on a mode signal. Based on this mode information, the plurality of camera modules 1100a, 1100b, and 1100c may operate in a first operation mode and a second operation mode in relation to a sensing speed.

In the first operation mode, the plurality of camera modules 1100a, 1100b, and 1100c may generate an image signal at a first rate (for example, generate an image signal at a first frame rate), encode the image signal at a second rate higher than the first rate (for example, encode an image signal at a second frame rate higher than the first frame rate), and transmit the encoded image signal to the application processor 1200. At this time, the second rate may be 30 times or less than the first rate.

The application processor 1200 may store a received image signal, that is, an encoded image signal in the internal memory 1230 or the external memory 1400 external to the application processor 1200 and thereafter, may read and decode the encoded image signal from the internal memory 1230 or the external memory 1400 and display image data that is generated based on the decoded image signal. For example, a corresponding sub processor among the plurality of sub processors 1212a, 1212b, and 1212c of the image processing device 1210 may perform decoding and may also perform image processing on the decoded image signal.

In the second operation mode, the plurality of camera modules 1100a, 1100b, and 1100c may generate image signals at a third rate less than the first rate (for example, generate image signals at a third frame rate less than the first frame rate) and transmit the image signals to the application processor 1200. The image signal provided to the application processor 1200 may include a signal not encoded. The application processor 1200 may perform image processing on a received image signal or store the image signal in the internal memory 1230 or external memory 1400.

The PMIC 1300 may supply power, for example, a power supply voltage to each of the plurality of camera modules 1100a, 1100b, and 1100c. For example, under the control of the application processor 1200, the PMIC 1300 may supply first power to the camera module 1100a through a power signal line PSLa, supply second power to the camera module 1100b through a power signal line PSLb, and supply third power to the camera module 1100c through a power signal line PSLc.

In response to a power control signal PCON from the application processor 1200, the PMIC 1300 may generate power corresponding to each of the plurality of camera modules 1100a, 1100b, and 1100c, and also adjust a power level. The power control signal PCON may include a power adjustment signal for each operation mode of the plurality of camera modules 1100a, 1100b, and 1100c. For example, the operation mode may include a low power mode, and in this case, the power control signal PCON may include information about the camera module operating in the low power mode, and information about the set power level. The levels of power provided to the plurality of camera modules 1100a, 1100b, and 1100c may be the same or different from each other. Also, the level of power may change dynamically.

As described above, embodiments have been disclosed in the drawings and specification. Although some example embodiments have been described in this specification by using specific terms, this is only used for the purpose of explaining the technical idea of the inventive concepts and is not used to limit the meaning or scope of the inventive concepts as set forth in the claims. Therefore, those skilled in the art will understand that various modifications and other equivalent embodiments are possible therefrom. Therefore, the true technical protection scope of the inventive concepts should be defined by the technical spirit of the attached claims.

As described herein, any devices, systems, modules, portions, units, controllers, circuits, and/or portions thereof according to any of the example embodiments, and/or any portions thereof (including, without limitation, the digital imaging device 1, the image sensor 100, the pixel array 110, the control unit 120, the signal processing unit 130, the row driver 140, the signal read unit 150, the correlated-double sampler (CDS) 151, the analog-to-digital converter (ADC) 153, the buffer 155, the ramp signal generator 157, the imaging unit 200, the lens 210, the lens driving unit 220, the aperture 230, the aperture driving unit 240, the processor 300, the electronic device 1000, the plurality of camera modules 1100a, 1100b, and 1100c, the prism 1105, the optical path folding element OPFE 1110, the actuator 1130, the image sensing device 1140, the image sensor 1142, the control logic 1144, the memory 1146, the storage unit 1150, the application processor 1200, the image processing device 1210, the plurality of sub processors 1212a, 1212b, and 1212c, the image generator 1214, the camera module controller 1216, the memory controller 1220, the internal memory 1230, the PMIC 1300, the external memory 1400, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, portions, units, controllers, circuits, and/or portions thereof according to any of the example embodiments.

While the inventive concepts have been particularly shown and described with reference to some example embodiments thereof, it will be understood that various changes in form and details may be made therein without departing from the spirit and scope of the following claims.

What is claimed is:

1. An image sensor, comprising:
a first pixel; and
a second pixel,
wherein the first pixel includes
a first photodiode,
a second photodiode at least partially overlapping the first photodiode in a first direction,
a first metal shield on one photodiode of the first photodiode or the second photodiode in a vertical direction perpendicular to the first direction, a first color filter on another photodiode of the first photodiode or the second photodiode in the vertical direction, and
a first micro lens on both the first metal shield and the first color filter in the vertical direction, and
wherein the second pixel includes
a third photodiode,
a fourth photodiode at least partially overlapping the third photodiode in the first direction,
a second color filter on both the third photodiode and the fourth photodiode in the vertical direction, and
a second micro lens on the second color filter in the vertical direction.

2. The image sensor of claim 1,
wherein the first pixel and the second pixel are adjacent to each other in the first direction.

3. The image sensor of claim 2, wherein
the first metal shield is on the first photodiode and the first color filter is on the second photodiode, and
the first metal shield is configured to block incident light passing through the first micro lens from being incident on the first photodiode, the incident light inclined in relation to the first photodiode.

4. The image sensor of claim 2, wherein
the first color filter on the first photodiode and the first metal shield is on the second photodiode, and
the first metal shield is configured to block incident light passing through the first micro lens from being incident on the second photodiode, the incident light inclined in relation to the second photodiode.

5. The image sensor of claim 1, wherein
the first pixel comprises an auto focusing (AF) pixel, and the second pixel comprises a general pixel.

6. The image sensor of claim 1,
wherein the first pixel and the second pixel comprise separate, respective auto focusing (AF) pixels.

7. The image sensor of claim 1, further comprising:
a Bayer pattern of color filters, the Bayer pattern including the first color filter and the second color filter, the Bayer pattern including a green color filter, a red color filter, and a blue color filter, such that
the first color filter is one filter of the green color filter, the red color filter, or the blue color filter, and
the second color filter is another filter of the green color filter, the red color filter, or the blue color filter.

8. The image sensor of claim 1, further comprising:
a first device isolation film configured to separate the first photodiode from the second photodiode;
a second device isolation film configured to separate the third photodiode from the fourth photodiode; and
a third device isolation film configured to separate the first pixel from the second pixel.

9. The image sensor of claim 8,
wherein the first device isolation film, the second device isolation film, and the third device isolation film are spaced apart from each other in the first direction.

10. An image sensor, comprising:
a pixel array, the pixel array including a plurality of pixels arrayed in a first direction and a second direction, the plurality of pixels including a first pixel and a second pixel,
wherein the plurality of pixels are arrayed in two adjacent columns and two adjacent rows,
wherein the first pixel includes
a first photodiode,
a second photodiode at least partially overlapping the first photodiode in the first direction, a first metal shield on one photodiode of the first photodiode or the second photodiode in a vertical direction perpendicular to both the first direction and the second direction, and a first color filter on another photodiode of the first photodiode or the second photodiode in the vertical direction, and wherein the second pixel includes a third photodiode, a fourth photodiode at least partially overlapping the third photodiode in the first direction, and a second color filter on both the third photodiode and the fourth photodiode in the vertical direction.

11. The image sensor of claim 10, wherein the first metal shield is configured to block incident light.

12. The image sensor of claim 10, further comprising:

a Bayer pattern of color filters, the Bayer pattern including the first color filter and the second color filter, the Bayer pattern including a green color filter, a red color filter, and a blue color filter, such that the first color filter is one filter of the green color filter, the red color filter, or the blue color filter, and the second color filter is another filter of the green color filter, the red color filter, or the blue color filter.

13. The image sensor of claim 10, wherein the first pixel and the second pixel comprise separate, respective auto focusing (AF) pixels, and the first pixel and the second pixel are adjacent to each other in the first direction.

14. The image sensor of claim 10, further comprising:

a first device isolation film configured to separate the first photodiode from the second photodiode;

a second device isolation film configured to separate the third photodiode from the fourth photodiode;

a third device isolation film configured to separate the first pixel from the second pixel; and a grid pattern on the third device isolation film.

15. The image sensor of claim 14, wherein the first device isolation film, the second device isolation film, and the third device isolation film are spaced apart at equal intervals in the first direction or the second direction.

16. The image sensor of claim 10, wherein the first photodiode and the second photodiode are connected to one floating diffusion node, and the third photodiode and the fourth photodiode are connected to the one floating diffusion node.

17. The image sensor of claim 10, further comprising:

a first micro lens on both the first metal shield and the first color filter of the first pixel in the vertical direction; and a second micro lens on both the second color filter of the second pixel in the vertical direction.

* * * * *